United States Patent
Wang et al.

(10) Patent No.: US 9,807,399 B2
(45) Date of Patent: Oct. 31, 2017

(54) BORDER PIXEL PADDING FOR INTRA PREDICTION IN VIDEO CODING

(71) Applicant: QUALCOMM Incorporated, San Diego, CA (US)

(72) Inventors: Xianglin Wang, San Diego, CA (US); Wei-Jung Chien, San Diego, CA (US); Marta Karczewicz, San Diego, CA (US); Ying Chen, San Diego, CA (US); Peisong Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/612,912

(22) Filed: Jun. 2, 2017

(65) Prior Publication Data
US 2017/0272765 A1 Sep. 21, 2017

Related U.S. Application Data

(62) Division of application No. 13/493,640, filed on Jun. 11, 2012.
(Continued)

(51) Int. Cl.
*H04N 19/563* (2014.01)
*H04N 19/593* (2014.01)
(Continued)

(52) U.S. Cl.
CPC ......... *H04N 19/182* (2014.11); *H04N 19/105* (2014.11); *H04N 19/593* (2014.11); *H04N 19/61* (2014.11)

(58) Field of Classification Search
CPC .................................................... H04N 19/00
See application file for complete search history.

(56) References Cited

U.S. PATENT DOCUMENTS

2007/0003149 A1  1/2007 Nagumo et al.
2009/0316788 A1  12/2009 Techernatinsky et al.
(Continued)

FOREIGN PATENT DOCUMENTS

| CN | 101365136 A | 2/2009 |
|---|---|---|
| CN | 102006467 A | 4/2011 |
| WO | 2011126159 A1 | 10/2011 |

OTHER PUBLICATIONS

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.
(Continued)

*Primary Examiner* — James Pontius
*Assistant Examiner* — Kyle Lotfi

(57) ABSTRACT

A video coder performs a padding operation that processes a set of border pixels according to an order. The order starts at a bottom-left border pixel and proceeds through the border pixels sequentially to a top-right border pixel. When the padding operation processes an unavailable border pixel, the padding operation predicts a value of the unavailable border pixel based on a value of a border pixel previously processed by the padding operation. The video coder may generate an intra-predicted video block based on the border pixels.

27 Claims, 14 Drawing Sheets

Related U.S. Application Data

(60) Provisional application No. 61/496,504, filed on Jun. 13, 2011, provisional application No. 61/557,361, filed on Nov. 8, 2011, provisional application No. 61/557,845, filed on Nov. 9, 2011.

(51) Int. Cl.
　　*H04N 19/182*　　(2014.01)
　　*H04N 19/105*　　(2014.01)
　　*H04N 19/61*　　(2014.01)

(56) References Cited

U.S. PATENT DOCUMENTS

| | | |
|---|---|---|
| 2010/0177821 A1 | 7/2010 | Kadoto et al. |
| 2010/0208799 A1 | 8/2010 | Park et al. |
| 2011/0051812 A1 | 3/2011 | Tanaka et al. |
| 2011/0122950 A1 | 5/2011 | Ji et al. |
| 2011/0228848 A1 | 9/2011 | Dvir et al. |
| 2011/0243436 A1 | 10/2011 | Seregin et al. |
| 2011/0280304 A1 | 11/2011 | Jeon et al. |
| 2012/0163457 A1* | 6/2012 | Wahadaniah ........ H04N 19/105 375/240.13 |
| 2012/0314767 A1 | 12/2012 | Wang et al. |

OTHER PUBLICATIONS

Bross B., et al., "High Efficiency Video Coding (HEVC) text specification draft 8", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL: Http://Wftp3.Itu.Int/Av-Arch/Jctvc-Site,, No. JCTVC-J1003_d7, Jul. 23, 2012 (Jul. 23, 2012), XP030112947, 260 Pages.
Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, p. 259.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Chono K., et al., "Constrained Intra Prediction for Reducing Visual Artifacts caused by Lossy Decoder-side Memory Compression", [online], Jan. 22, 2011, Joint Collaborative Team on Video Coding (JCT-VC) of ITU-T SG16 WP3 and ISO/IEC JTC1/SC29/WG11, Document: JCTVC-D086.
International Preliminary Report on Patentability—PCT/US2012/042052, The International Bureau of WIPO—Geneva, Switzerland, Aug. 13, 2013 (120491WO).
International Search Report and Written Opinion—PCT/US2012/042052—ISA/EPO—Jul. 24, 2012 (120491WO).
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Lee T. et al., "Non-CE6: Simplified reference samples padding for intra prediction", 7. JCT-VC Meeting; 98. MPEG Meeting; Geneva; (Joint Collaborative Team on Video Coding of ISO/IEC JTC1/SC29/WG11 and ITU-T SG.16), No. JCTVC-G791, Nov. 9, 2011, XP030110775.
Lin Y., et al., "Intra coding improvements for slice boundary blocks", [online], Jan. 21, 2011, Joint Collaborative Team on Video Coding (JCT-VC) of ITU-T SG16 WP3 and ISO/IEC JTC1/SC29/WG11, Document: JCTVC-D302.
Second Written Opinion from International Application No. PCT/US2012/042052, dated May 16, 2013, 4 pp.
Sjaberg (Ericsson) et al, "BoG report and proposal on padding of unavailable reference samples for intra prediction", Mar. 19, 2011, No. JCTVC-E488, Mar. 19, 2011, XP030008994, ISSN: 0000-0003.
Sjaberg et al, "Constrained Intra source code implementation", 4. JCT-VC Meeting; 95. MPEG Meeting; Daegu; (Joint Collaborative Team on Video Coding of ISO/IEC JTC1/SC29/WG11 AND ITU-T SG.16), No. JCTVC-D386, Jan. 16, 2011, XP030008425, ISSN: 0000-0013.
Wahadaniah V., "Constrained Intra Prediction Scheme for Flexible-Sized Prediction Units in HEVC", 4. JCT-VC Meeting; 95. MPEG Meeting; Daegu; (Joint Collaborative Team on Video Coding of ISO/IEC JTC1/SC29/WG11 AND ITU-T SG.16), No. JCTVC-D094, Jan. 14, 2011, XP030008134, ISSN: 0000-0015.
Wang X. et al., "AHG16: Padding process simplification", 98. MPEG Meeting; Geneva; (Motion Picture Expert Group or ISO/IEC JTC1/SC29/WG11), No. m22384, Nov. 24, 2011, XP030050947.
Wenger S., et al.,"Adaptation Parameter Set (APS)", 6. JCT-VC Meeting; 97. MPEG Meeting; Jul. 14, 2011-Jul. 22, 2011; Torino; (Joint Collaborative Team on Video Coding of ISO/ IEC JTC1/SC29/WG11 and ITU-T SG.16 ); URL: Http://WFTP3.ITU.INT/Av-Arch/Jctvc-Site/, No. JCTVC-F747, Jul. 21, 2011 (Jul. 21, 2011), XP030009770.
Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.
Wiegand, T., et al., "WD3: Working Draft 3 of High-Efficiency Video Coding," Document JCTVC-E603, 5th Meeting: Geneva, CH, Mar. 16-23, 2011, 193 pages.
Wiegand T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.
Response to Written Opinion dated Jul. 24, 2012, from International Application No. PCT/US2012/042052, filed Oct. 23, 2012, 25 pp.
Response to Second Written Opinion dated May 16, 2013, from International Application No. PCT/US2012/042052, dated Jul. 10, 2013, 15 pp.
Prosecution History from U.S. Appl. No. 13/493,640, dated from Jan. 28, 2013 through Jan. 18, 2017, 160 pp.

\* cited by examiner

BORDER PIXEL PADDING FOR INTRA PREDICTION IN VIDEO CODING

This application is a divisional application of U.S. patent application Ser. No. 13/493,640, filed Jun. 11, 2012, which claims the benefit of U.S. Provisional Application No. 61/496,504, filed Jun. 13, 2011, U.S. Provisional Application No. 61/557,361, filed Nov. 8, 2011, and U.S. Provisional Application No. 61/557,845, filed Nov. 9, 2011, the entire content each of which is hereby incorporated by reference.

TECHNICAL FIELD

This disclosure relates to video coding and, more particularly, intra prediction of video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for padding border pixels for intra prediction in video coding. In accordance with the techniques of this disclosure, the video coder may perform a padding operation that assigns values to unavailable border pixels. The padding operation may process the border pixels according to an order that starts at a bottom-left border pixel and proceeds through the border pixels sequentially to a top-right border pixel. When the padding operation processes an unavailable border pixel, the padding operation may assign a value to the unavailable border pixel based on a value of a border pixel previously processed by the padding operation. The video coder may generate an intra-predicted video block based on the border pixels.

In one aspect, this disclosure describes a method for coding video data. The method comprises performing a padding operation that processes a set of border pixels according to an order that starts at a bottom-left border pixel and proceeds through the border pixels sequentially to a top-right border pixel. When the padding operation processes an unavailable border pixel, the padding operation assigns a value to the unavailable border pixel based on a value of a border pixel previously processed by the padding operation. The method also comprises generating an intra-predicted video block based on the border pixels.

This disclosure also describes a video coding apparatus that comprises one or more processors configured to perform a padding operation that processes a set of border pixels according to an order that starts at a bottom-left border pixel and proceeds through the border pixels sequentially to a top-right border pixel. When the padding operation processes an unavailable border pixel, the padding operation assigns a value to the unavailable border pixel based on a value of a border pixel previously processed by the padding operation. The one or more processors are also configured to generate an intra-predicted video block based on the border pixels.

In addition, this disclosure describes a video coding apparatus comprising means for performing a padding operation that processes a set of border pixels according to an order that starts at a bottom-left border pixel and proceeds through the border pixels sequentially to a top-right border pixel. When the padding operation processes an unavailable border pixel, the padding operation assigns a value to the unavailable border pixel based on a value of a border pixel previously processed by the padding operation. The video coding apparatus also comprises means for generating an intra-predicted video block based on the border pixels.

This disclosure also describes a computer program product that comprises one or more computer-readable storage media that store computer-executable instructions that, when executed, cause one or more processors to perform a padding operation that processes a set of border pixels according to an order that starts at a bottom-left border pixel and proceeds through the border pixels sequentially to a top-right border pixel. When the padding operation processes an unavailable border pixel, the padding operation assigns a value to the unavailable border pixel based on a value of a pixel previously processed by the padding operation. The instructions also cause the one or more processors to generate an intra-predicted video block based on the border pixels.

The details of one or more examples are set forth in the accompanying drawings and the description below. Other features, objects, and advantages will be apparent from the description and drawings, and from the claims.

DETAILED DESCRIPTION

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

A video coder may generate an intra-predicted video block based on a set of pixels that border the video block on the top and left sides of the video block. The border pixels on the left side of the video block may extend below the bottom row of pixels of the video block and the border pixels on the top side of the video block may extend to the right of the rightmost column of pixels of the video block.

In some instances, one or more of the border pixels may be unavailable. Accordingly, the video coder may perform a padding operation that assigns values to unavailable border pixels. The padding operation may process the border pixels according to an order that starts at a bottom-left border pixel and proceeds through the border pixels sequentially to a top-right border pixel. When the padding operation processes an unavailable border pixel, the padding operation may assign a value to the unavailable border pixel based on a value of a border pixel previously processed by the padding operation. After performing the padding operation, the video coder may generate the intra-predicted video block based on the border pixels. If the video coder is a video encoder, the video coder may generate encoded video data based on the intra-predicted video block. For instance, the video encoder may generate residual data based at least in part on the intra-predicted video block. If the video coder is a video decoder, the video coder may generate decoded video data based on the intra-predicted video block. For instance, the video decoder may reconstruct a decoded video block based at least in part on the intra-predicted video block and a residual video block.

Figure 1:
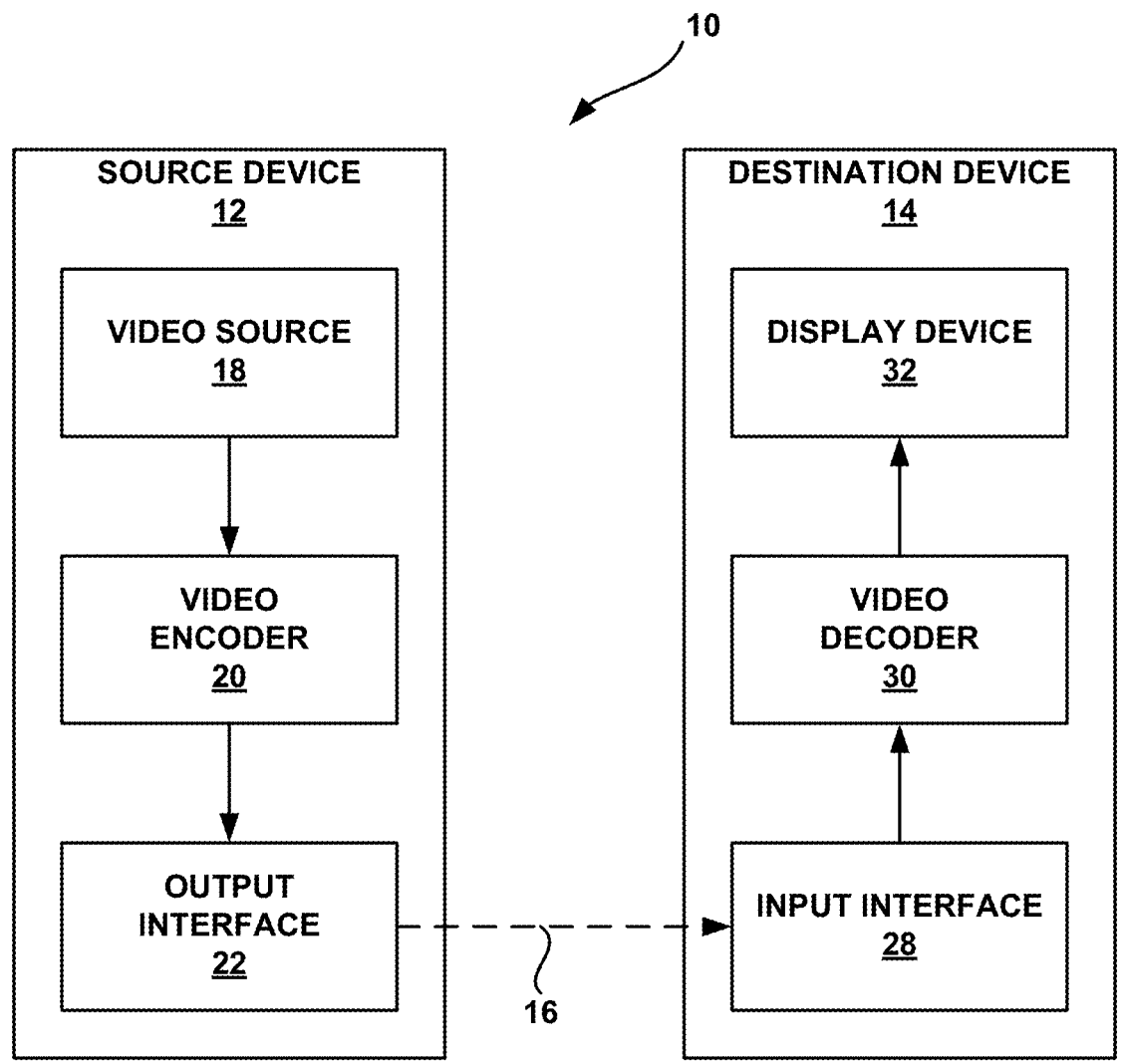
FIG. 1 is a block diagram illustrating an example video coding system that may implement the techniques of this disclosure.

FIG. 1 is a block diagram that illustrates an example video coding system 10 that may utilize the techniques of this disclosure. As used described herein, the term "video coder" refers generically to both video encoders, video decoders, and combined encoder-decoders (CODECs) . In this disclosure, the terms "video coding" or "coding" may refer generically to video encoding and video decoding. The terms coder, encoder, decoder and CODEC may all refer to specific machines designed for the coding (encoding and/or decoding) of video data consistent with this disclosure. A device that performs video coding may be referred to as a video coding device or apparatus.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or another intermediate storage device via streaming or download. The file server may be a type of server capable of storing encoded video data and transmitting the encoded video data to destination device 14. Example file servers include web servers (e.g., for a website), FTP servers, network attached storage (NAS) devices, and local disk drives. Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some cases, output interface 22 may include a modulator/demodulator (modem) and/or a transmitter. Video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode video data. Output interface 22 may directly transmit the encoded video data to destination device 14. Alternatively, output interface 22 may store the encoded video data onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements that represent the video data.

Display device 32 may be integrated with or may be external to destination device 14. In other examples, destination device 14 may be a display device. In general, display device 32 displays decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other example video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. In some examples, the MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between encoding and decoding devices. In many examples, video encoding and video decoding is performed by devices that do not communicate with one another, but store encoded video data to memory and/or retrieve and decode encoded video data from memory.

Video encoder 20 and video decoder 30 each may be implemented using various types of circuitry, such as one or more microprocessors, digital signal processors (DSPs), application specific integrated circuits (ASICs), field programmable gate arrays (FPGAs), discrete logic, hardware, or any combinations thereof. In some instances, video encoder 20 and video decoder 30 may be at least partially implemented in software. When video encoder 20 and/or video decoder 30 are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data.

To generate the bitstream, video encoder 20 may perform encoding operations on each picture in the video data. When video encoder 20 performs encoding operations on the pictures, video encoder 20 may generate a series of coded pictures and associated data. A coded picture is a coded representation of a picture. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in the PPS may be fixed for a set of pictures, whereas parameters in different adaptation parameter sets may be applicable to different pictures in the set of pictures.

To generate a coded picture, video encoder 20 may partition a picture into equally-sized non-overlapping video blocks. Each of the video blocks is associated with a treeblock. In some instances, a treeblock may also be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on each non-partitioned CU of a treeblock. A non-partitioned CU is a CU whose video block is not partitioned into video blocks for other CUs. As part of performing an encoding operation on a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. In this disclosure, the term "sample" may refer to a brightness (luminance) or color (chrominance) of a pixel. Video encoder 20 may use intra prediction or inter prediction to generate the predicted video block for a PU.

When video encoder 20 uses intra prediction to generate the predicted video block of a PU, video encoder 20 may generate the predicted video block of the PU based on samples of the picture associated with the PU. If video encoder 20 uses intra prediction to generate predicted video blocks of the PUs of a CU, the CU is an intra-predicted CU.

When video encoder 20 uses inter prediction to generate the predicted video block of the PU, video encoder 20 may generate the predicted video block of the PU based on values of pictures other than the picture associated with the PU. In other words, video encoder 20 may generate the predicted video block of the PU based on samples in one or more reference pictures. In addition, when video encoder 20 uses inter prediction to generate a predicted video block for a PU, video encoder 20 may generate motion information for the PU. The motion information for a PU may indicate a portion of a reference picture that corresponds to the video block of the PU. In other words, the motion information for a PU may indicate a "reference sample" for the PU. Video encoder 20 may generate the predicted video block for the PU based on the portions of the reference pictures that are indicated by the motion information for the PU. If video encoder 20 uses inter prediction to generate predicted video blocks for the PUs of a CU, the CU is an inter-predicted CU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block. Video coder 20 may perform transform operations on each TU of the CU.

When video encoder 20 performs the transform operation on a TU, video encoder 20 may apply one or more transforms to a residual video block associated with the TU to generate one or more transform coefficient blocks (i.e., blocks of transform coefficients) associated with the TU. Conceptually, a transform coefficient block may be a two-dimensional (2D) matrix of transform coefficients.

After generating a transform coefficient block, video encoder 20 may perform a quantization operation on the transform coefficient block. Quantization generally refers to a process in which transform coefficients are quantized to possibly reduce the amount of data used to represent the transform coefficients, providing further compression. Quantization may reduce the bit depth associated with some or all of the transform coefficients. For example, an n-bit transform coefficient may be rounded down to an m-bit transform coefficient during quantization, where n is greater than m.

Video encoder 20 may associate each CU or a number of CUs with a quantization parameter (QP) value. The QP value associated with a CU may determine how video encoder 20 quantizes transform coefficient blocks associated with the CU or the number of CUs. Video encoder 20 may adjust the degree of quantization applied to the transform coefficient blocks associated with a CU by adjusting the QP value associated with the CU.

After video encoder 20 quantizes a transform coefficient block, video encoder 20 may scan the quantized transform coefficients to produce a one-dimensional vector of transform coefficient levels. Video encoder 20 may entropy encode the one-dimensional vector. Video encoder 20 may also entropy encode other syntax elements associated with the video data.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include entropy encoded syntax structures, such as entropy-encoded transform coefficient blocks, motion information, and so on.

Video decoder 30 may receive the bitstream generated by video encoder 20. The bitstream may include an encoded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate intra-predicted or inter-predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may determine the video blocks of CUs based on the syntax elements in the bitstream.

As described briefly above, a video coder, such as video encoder 20 or video decoder 30, may use intra-prediction to generate a predicted video block for a PU. For ease of explanation, this disclosure may refer to a predicted video block generated using intra-prediction as an intra-predicted video block. When the video coder generates an intra-predicted video block for a PU, the video coder may assign the values of various border pixels to pixels in the intra-predicted video block.

Figure 2:
FIG. 2 is a conceptual diagram that illustrates an example video block and a set of border pixels associated with the video block.

FIG. 2 is a conceptual diagram that illustrates an example video block 50 and a set of border pixels associated with video block 50. Video block 50 may be associated with a PU of a CU that a video coder is currently coding. In the example of FIG. 2, video block 50 consists of sixteen pixels labeled a-p. In the example of FIG. 2, the border pixels are labeled A-R. Other video blocks may be larger or smaller than video block 50. In general, a video block may be associated with 2*w+1 border pixels above the video block and 2*h+1 border pixels to the left of the video block, where w is the width and h is the height of the video block.

The border pixels above a video block (e.g., video block 50) may form a top predictor. In other words, the top predictor may be an array of reference samples corresponding to a row of samples lying above the video block. If the top-left pixel of the video block has coordinates (x, y) and the size of the video block is N×N, the samples with coordinates (x+i, y−1), where i ranges from −1 through 2N, form the top predictor. The border pixels to the left of the video block form a left predictor. In other words, the left predictor may be an array of reference samples corresponding to a column of samples lying to the left of the video block. If the top-left pixel of the video block has coordinates (x, y) and the size of the video block is N×N, the samples with coordinates (x−1, y+j), where j ranges from −1 through 2N form the left predictor.

Figure 3A:
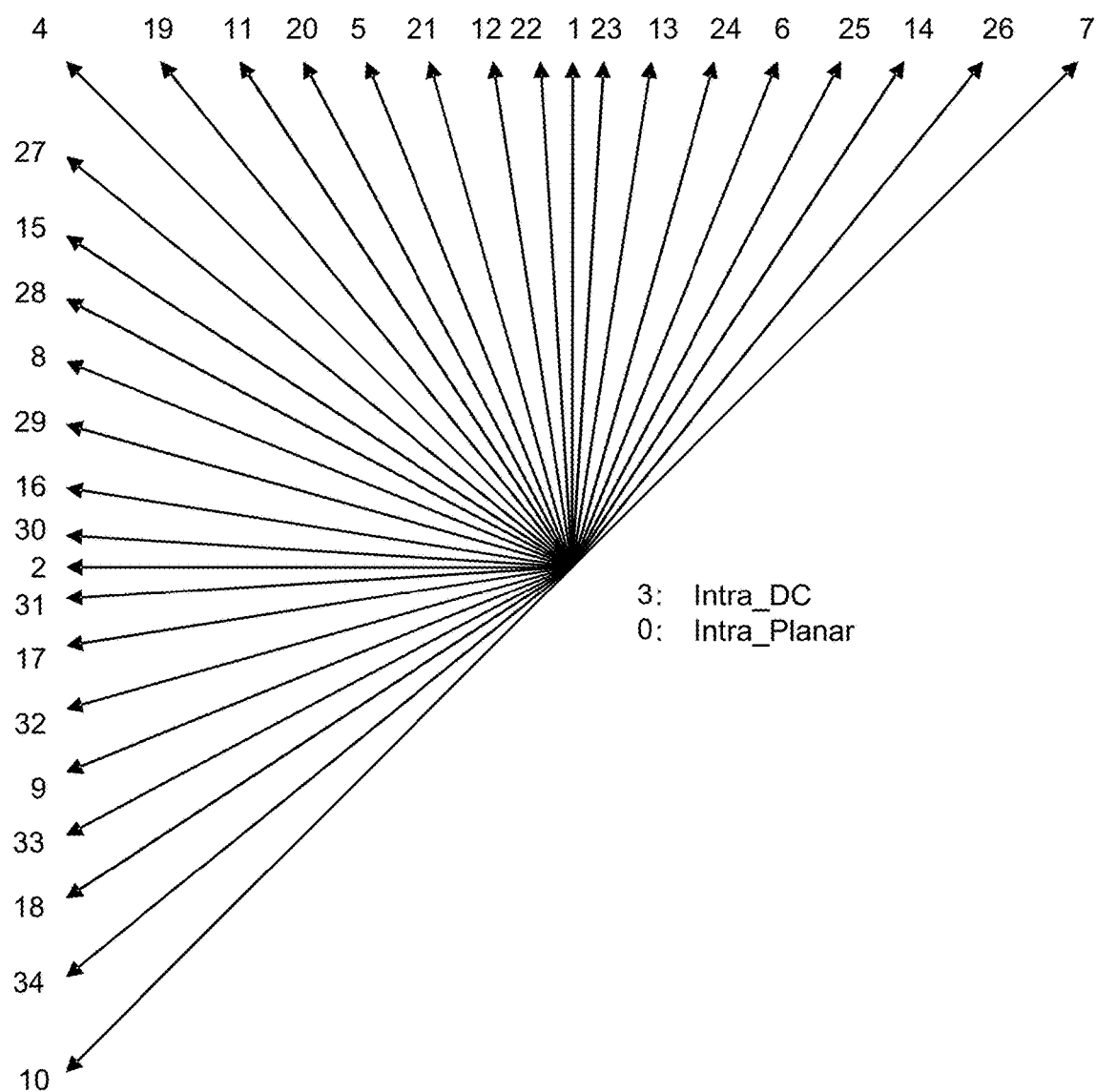
FIG. 3A is a conceptual diagram that illustrates example intra-prediction modes in High Efficiency Video Coding.

FIG. 3A is a conceptual diagram that illustrates example intra-prediction modes in HEVC. In the example of FIG. 3A, intra-prediction modes 1, 2, and 4-33 correspond to different directions from which a video coder may extend border pixels to generate an intra-predicted video block. For example, when the video coder uses intra-prediction mode 1, the video coder may generate an intra-predicted video block by extending the values of border pixels vertically downward. In this example, the video coder may use intra-prediction mode 1 to generate video block 50 (FIG. 2) by assigning the value of border pixel A to pixels a, e, i, and m, by assigning the value border pixel B to pixels b, f, j, and n, by assigning the value of border pixel C to pixels c, g, k, and o, and by assigning the value of border pixel D to pixels d, h, l, and p.

Mode 0 may refer to a planar mode. The video coder may use to following formula to generate an intra-predicted video block using planar mode:

$$predSamples[x, y]=((nS-1-x)*p[-1, y]+(x+1)*p[nS, -1]+(nS-1-y)*p[x, -1]+(y+1)*p[-1, nS]+nS)>> (k+1)$$

with x, y=0 ... nS−1 where k=Log 2(nS)

In the formula above, predSamples[x, y] is an array of intra-predicted samples, nS indicates a size of the predicted video block, and p[x, y] is an array of neighboring samples.

Mode 3 may refer to a DC mode. To generate an intra-predicted video block using the DC mode, the video coder may first calculate a value DCVal using the following formula:

$$DCVal = \left(\sum_{x'=0}^{nS-1} p[x', -1] + \sum_{y'=0}^{nS-1} p[-1, y'] + nS\right) >> (k+1),$$

with x, y = 0 ... nS − 1

If a chrominance index (cIdx) of a current block is equal to 0, the following applies.

$$predSamples[0, 0]=(1*p[-1, 0]+2*DCVal+1*p[0, -1]+2)>>2$$

$$predSamples[x, 0]=(1*p[x, -1]+3*DCVal+2)>>2,$$
with x=1 ... nS−1

$$predSamples[0, y]=(1*p[-1, y]+3*DCVal+2)>>2, \text{ with}$$
y=1 ... nS−1

$$predSamples[x, y]=DCVal, \text{ with x, y=1 ... nS−1}$$

Otherwise, the prediction samples predSamples[x, y] are derived as $$predSamples[x, y]=DCVal, \text{ with x, y=0 ... nS−1}$$

In the formulas above, predSamples[x, y] is an array of intra-predicted samples, nS indicates a size of the predicted video block, and p[x, y] is an array of neighboring samples.

In another example, when the video coder uses intra-prediction mode 10, the video coder may generate an intra-predicted video block by extending the values of border pixels diagonally from bottom-left to top-right. In the example of FIG. 2, the video coder may use intra-prediction mode 10 to generate video block 50 by assigning the value of border pixel J to pixel a, by assigning the value of border pixel K to pixels e and b, by assigning the value of border pixel L to pixels i, f, and c, by assigning the value of border pixel M to pixels m, j, g, and d, by assigning the value of border pixel N to pixels n, k, and h, by assigning the value of border pixel O to pixels o and 1, and by assigning the value of border pixel P to pixel p.

Figure 3B:
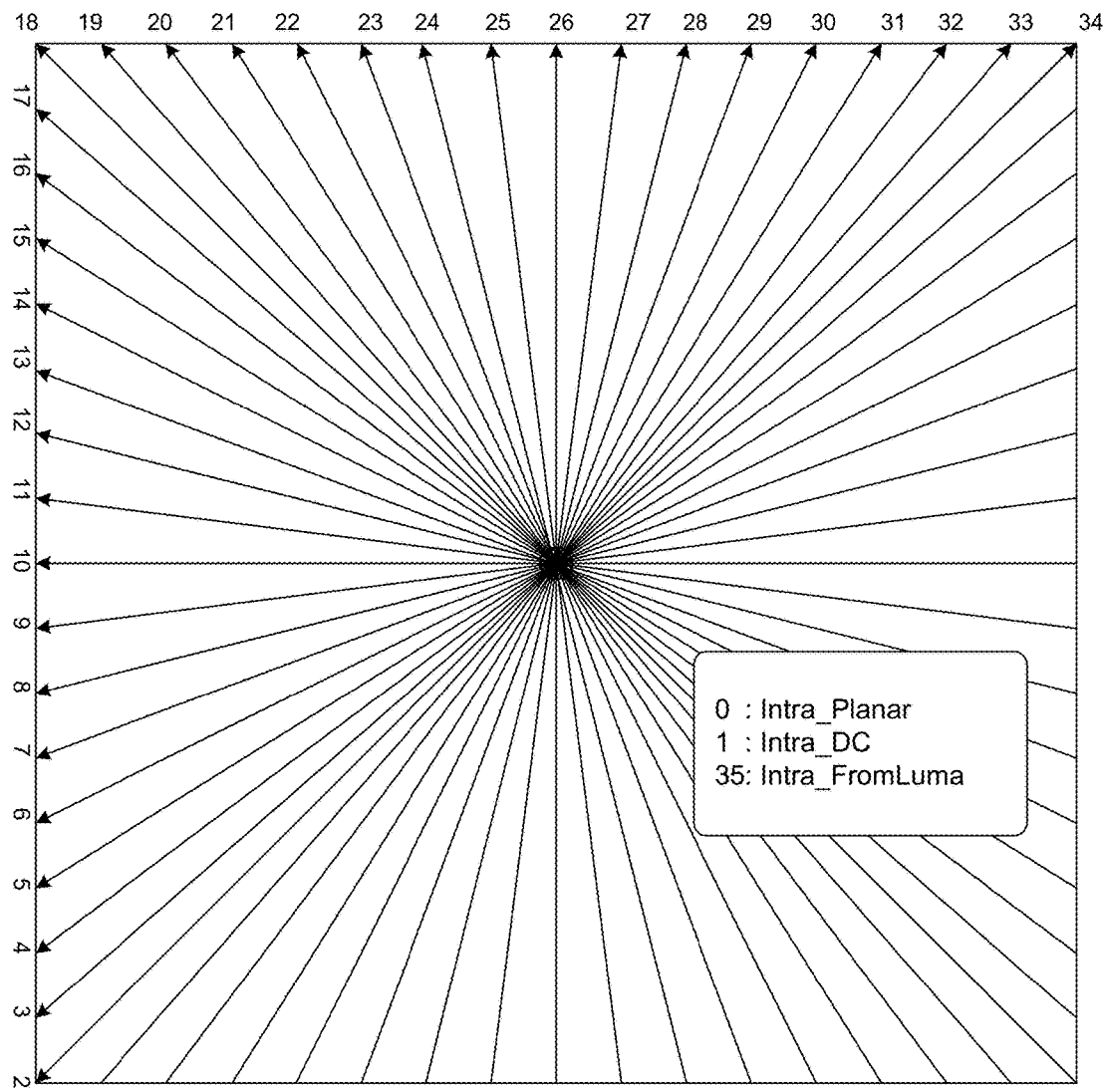
FIG. 3B is a conceptual diagram that indicates another example assignment of numbers to different intra prediction modes.

In other examples, the video coder may use different numbers to indicate intra-prediction modes. For instance, FIG. 3B is a conceptual diagram that indicates another assignment of numbers to different intra prediction modes.

Figure 3C:
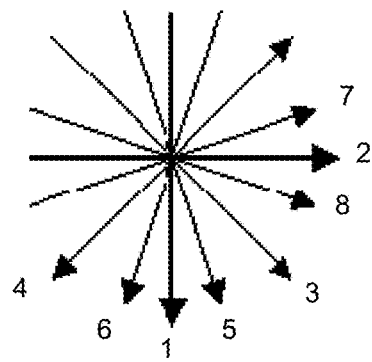
FIG. 3C is a conceptual diagram that illustrates example intra-prediction modes in H.264/AVC.

FIG. 3C is a conceptual diagram that illustrates example intra-prediction modes in H.264/AVC. There may be fewer available intra-prediction modes in H.264/AVC.

In some instances, one or more of the border pixels associated with an intra-predicted video block are unavailable. The set of border pixels associated with an intra-predicted video block may include the border pixels that the video coder may use to generate the intra-predicted video block. When a border pixel is unavailable, the video coder may be unable to access the value of the border pixel. Accordingly, the video coder may be unable to use the value of the border pixel to generate an intra-predicted video block.

A border pixel may be unavailable for a variety of reasons. For example, a border pixel may be unavailable if the border pixel is outside the border of the current picture (i.e., the picture that the video coder is currently coding). In another example, a border pixel may be unavailable if the border pixel is outside the border of a current slice or tile (i.e., the slice or tile that the video coder is current coding) and cross-slice/tile prediction is disallowed. In another example, a border pixel may be unavailable if the border pixel is associated with an inter-predicted CU and constrained intra-prediction is enabled for the current picture.

Because one or more border pixels may be unavailable, the video coder may perform a padding operation that assigns values to unavailable border pixels. After the video coder performs the padding operation, the video coder may use the available values of the available border pixels and the assigned values of the unavailable border pixels to generate an intra-predicted video block.

Different video coders may assign values to unavailable border pixels in various ways. For example, the video coder may perform a padding operation that scans through the border pixels from a bottom-left border pixel (e.g., border pixel P in FIG. 2) to a corner pixel (e.g., border pixel R in FIG. 2) to a top-right border pixel (e.g., border pixel H in FIG. 2). In this example, when the video coder reaches an unavailable border pixel, the video coder may scan forward to until the video coder reaches a next available border pixel. Upon identifying the available border pixel, the padding operation may assign a value to the unavailable border pixel based on the values of the next available pixel and a previous available border pixel.

In the example padding operation described above, if there is no previous available border pixel, the video coder may scan ahead to find the first available border pixel and then assign the value of the first available border pixel to each unavailable border pixel prior to the first available border pixel. In other words, $P_{pad}=P_{next}$, where $P_{pad}$ is the value assigned to each unavailable border pixel prior to the first available border pixel and $P_{next}$ is the value of the next available border pixel. If there is no next available border pixel, the video coder may extrapolate the value of the unavailable border pixel from the value of the last available border pixel. In other words, $P_{pad}=P_{pre}$, where $P_{pad}$ is the value of each unavailable border pixel after the last available border pixel and $P_{pre}$ is the value of the last available border pixel. If no border pixels of $P_{pre}$ and $P_{next}$ are available, the video coder may assign a default value to the border pixels.

Assigning values to unavailable border pixels in the manner described in the previous paragraphs may have several disadvantages. For example, assigning values to each unavailable border pixel in this manner may require the video coder to perform several memory read operations to scan forward to find the next available border pixel. Consequently, the padding operation described above may require a jumpy style memory access. For instance, once the video coder locates a next available border pixel, the video coder may assign a value $P_{pad}$ to an unavailable border pixel. Then, the video coder may assign the value $P_{pad}$ to each border pixel from a current border pixel until the next available border pixel, which may require memory accesses starting from the current border pixel again. Such a back and forth style memory access pattern may not be desirable. Memory access operations may be time consuming and power intensive, especially when memory is accessed in a random manner in terms of data location.

In accordance with the techniques of this disclosure, the video coder may perform a padding operation that processes a set of border pixels according to an order that starts at a bottom-left border pixel (e.g., border pixel P in FIG. 2) and proceeds through the border pixels sequentially to a top-right border pixel (e.g., border pixel H in FIG. 2). When the padding operation processes an unavailable border pixel, the padding operation assigns a value to the unavailable border pixel based on a value of a border pixel previously processed by the padding operation. In this way, the video coder does not need to scan ahead to find the next available border pixel. At the same time, this padding operation may have little impact on coding efficiency of video data. Because the video coder may use a more regular and consistent memory access pattern, the complexity of the video coder may be reduced and performance of the video coder may be improved relative to video coders that implement other techniques.

Figure 4:
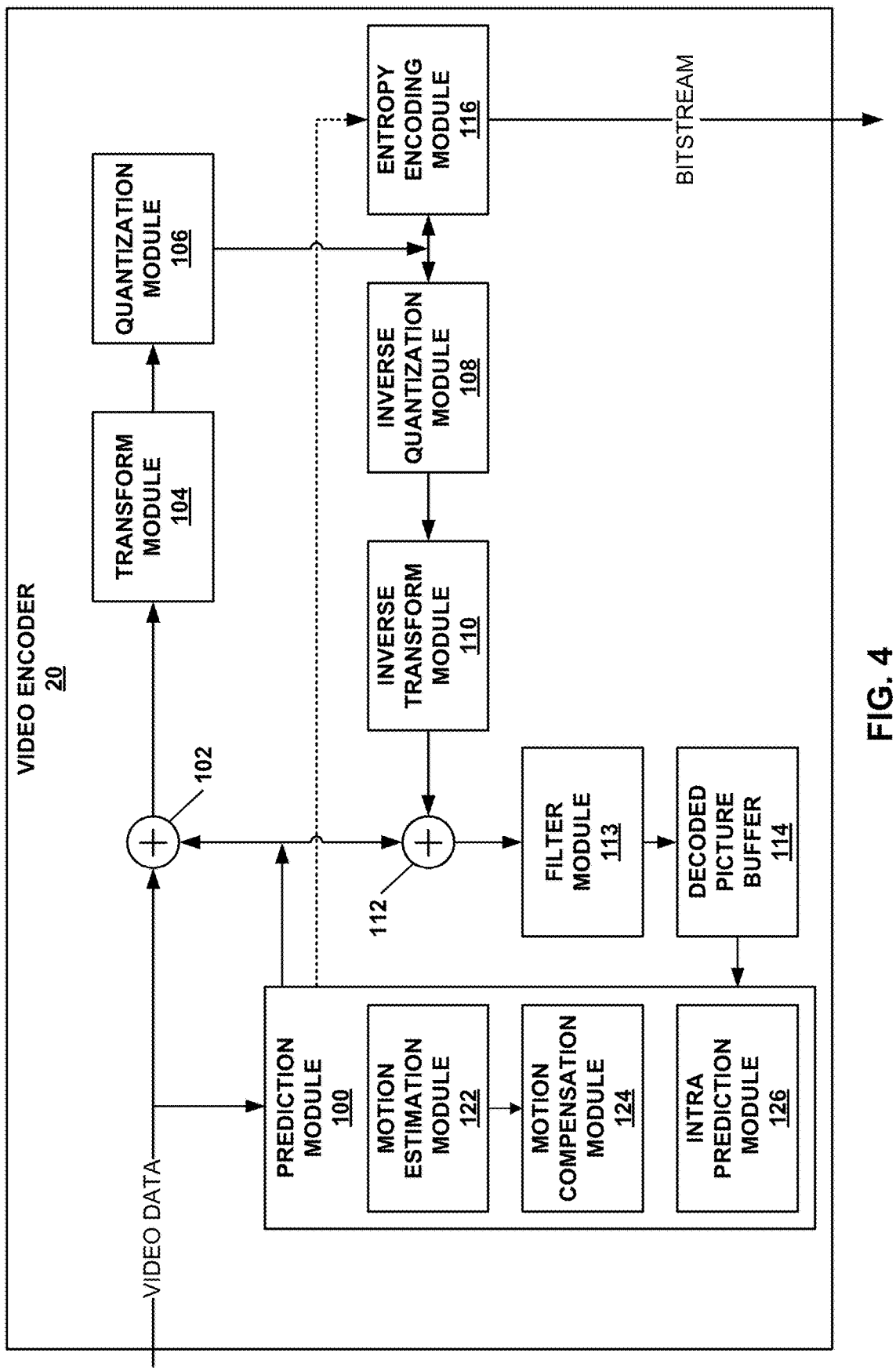
FIG. 4 is a block diagram illustrating an example video encoder that may implement the techniques of this disclosure.

FIG. 4 is a block diagram that illustrates an example video encoder 20 that is configured to implement the techniques of this disclosure. FIG. 4 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 4, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes a motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 4 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes corresponds to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks, and so on.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 may generate data representing an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support intra-prediction PU sizes of 2N×2N or N×N, and inter-prediction in symmetric PU sizes of 2N×2N, 2N×N, N×2N, N×N, or similar. Video encoder 20 and video decoder 30 may also support asymmetric partitioning for PU sizes of 2N×nU, 2N×nD, nL×2N, and nR×2N. In some examples, prediction module 100 may perform geometric partitioning to partition the video block of a CU among PUs of the CU along a boundary that does not meet the sides of the video block of the CU at right angles.

Motion estimation module 122 and motion compensation module 124 may perform inter prediction on each PU of the CU. Inter prediction may provide temporal compression. By performing inter prediction on a PU, motion estimation module 122 and motion compensation module 124 may generate prediction data for the PU based on decoded samples of reference pictures other than the picture associated with the CU. The prediction data for the PU may include a predicted video block and various syntax elements.

Furthermore, when motion estimation module 122 performs a motion estimation operation with regard to a PU, motion estimation module 122 may generate one or more motion vectors for the PU. For instance, slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." Each of the reference pictures in list 0 contains samples that may be used for inter prediction of subsequent pictures in decoding order. When motion estimation module 122 performs the motion estimation operation with regard to a PU in a P slice, motion estimation module 122 may search the reference pictures in list 0 for a reference sample for the PU. The reference sample of the PU may be a set of samples, e.g., a block of samples, that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference sample of a PU in a P slice, motion estimation module 122 may generate a reference index that indicates the reference picture in list 0 containing the reference sample and a motion vector that indicates a spatial displacement between the PU and the reference sample. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference sample values may be interpolated from integer-position sample values in the reference picture. Motion estimation module 122 may output motion information for the PU to entropy encoding module 116 and motion compensation module 124. The motion information for the PU may include the reference index and the motion vector of the PU. Motion compensation module 124 may use the motion information of a PU to identify and retrieve the reference sample of the PU.

If the PU is in a B slice, the picture containing the PU may be associated with two lists of reference pictures, referred to as "list 0" and "list 1." Each of the reference pictures in list 0 contains samples that may be used for inter prediction of subsequent pictures in decoding order. The reference pictures in list 1 occur before the picture in decoding order but after the picture in presentation order. In some examples, a picture containing a B slice may be associated with a list combination that is a combination of list 0 and list 1.

Furthermore, if the PU is in a B slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference sample for the PU. Motion estimation module 122 may then generate a reference index that indicates the reference picture in list 0 or list 1 that contains the reference sample and a motion vector that indicates a spatial displacement between the PU and the reference sample. Motion estimation module 122 may output syntax elements that indicate the motion information for the PU to entropy encoding module 116 and motion compensation module 124. The motion information for the PU may include the reference index, a prediction direction indicator, and the motion vector of the PU. The prediction direction indicator may indicate whether the reference index indicates a reference picture in list 0 or list 1. Motion compensation module 124 may use the motion information of the PU to identify and retrieve the reference sample of the PU.

When motion estimation module 122 performs bi-directional prediction for a PU, motion estimation module 122 may search the reference pictures in list 0 for a reference sample for the PU and may also search the reference pictures in list 1 for another reference sample for the PU. Motion estimation module 122 may then generate reference indexes that indicate the reference pictures in list 0 and list 1 containing the reference samples and motion vectors that indicate spatial displacements between the reference samples and the PU. Motion estimation module 122 may output syntax elements that indicate the motion information of the PU to entropy encoding module 116 and motion compensation module 124. The motion information for the PU may include the reference indexes and the motion vectors of the PU. Motion compensation module 124 may use the motion information to identify and retrieve the reference sample of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a quadtree node for a CU associated with the PU, a value that indicates to video decoder 30 that the PU has the same motion information as the neighboring PU. In another example, motion estimation module 122 may identify, in a quadtree node associated with the CU associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to predict the motion vector of the PU. By referring to the motion information of a first PU when signaling the motion information of a second PU, video encoder 20 may be able to signal the motion information of the second PU using fewer bits.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predicted video block and various syntax elements. Intra prediction module 126 may perform intra prediction on PUs in I slices, P slices, and B slices.

To perform intra prediction on a PU, intra prediction module 126 may use multiple intra prediction modes to generate multiple sets of prediction data for the PU. When intra prediction module 126 uses an intra prediction mode to generate a set of prediction data for the PU, intra prediction module 126 may extend samples from video blocks of neighboring PUs across the video block of the PU in a direction associated with the intra prediction mode. The neighboring PUs may be above, above and to the right, above and to the left, to the left, or below and to the left of the PU. Intra prediction module 126 may use various numbers of intra prediction modes, e.g., 35 directional intra prediction modes. Intra prediction module 126 may perform various intra-prediction operations. For example, intra prediction module 126 may perform the example intra-prediction operation of FIG. 6.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal the intra prediction mode that was used to generate the prediction data for the PUs, i.e., the selected intra prediction mode. Prediction module 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 100 may generate a syntax element to indicate that the selected intra prediction mode is the same as the intra prediction mode of the neighboring PU.

After prediction module 100 selects the prediction data for PUs of a CU, residual generation module 102 may generate residual data for the CU by subtracting the predicted video blocks of the prediction data of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predicted video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may perform a deblocking operation to reduce blocking artifacts in the video block associated with the CU. After performing the deblocking operations, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a context-adaptive binary arithmetic coding (CABAC) operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

As part of performing an entropy encoding operation on data, entropy encoding module 116 may select a context model. If entropy encoding module 116 is performing a CABAC operation, the context model may indicate probabilities of a bin having particular values. In the context of CABAC, the term "bin" is used to refer to a bit of a binarized version of a syntax element.

If the entropy encoding module 116 is performing a CAVLC operation, the context model may map coefficients to corresponding codewords. Codewords in CAVLC may be constructed such that relatively short codes correspond to more probable symbols, while relatively long codes correspond to less probable symbols. Selection of an appropriate context model may impact coding efficiency of the entropy encoding operation.

In some example, video encoder 20 may divide the CUs of a slice into a plurality of tiles. Video encoder 20 may divide the CUs into tiles by defining two or more horizontal boundaries for a picture and two or more vertical boundaries for the picture. The horizontal boundaries may include the top and bottom edges of the picture. The vertical boundaries may include the left and right sides of the picture. When the video encoder does not use tiles, video encoder 20 may encode all of the treeblocks of the frame in raster scan order. However, when video encoder 20 uses tiles, the video encoder may encode the tiles in raster scan order. When video encoder 20 encodes a tile, video encoder 20 may encode the treeblocks (i.e., LCUs) within the tile in raster scan order. Thus, video encoder 20 may use tiles to change the encoding order of the treeblocks of the picture.

Furthermore, in some instances, when video encoder 20 is encoding a given CU, video encoder 20 may use information associated with spatially-neighboring CUs to perform intra prediction on the given CU, so long as the given CU and the spatially-neighboring CUs belong to the same tile. The spatially-neighboring CUs may be CUs that are in the same picture as the given CU. (When video encoder 20 performs inter prediction on the given CU, video encoder 20 may also use motion and pixel information from temporally-neighboring CUs, regardless of the tiles of the temporally-neighboring CUs.) Similarly, in some instances, when video encoder 20 is encoding a given CU, video encoder 20 may use information associated with spatially-neighboring CUs to select a context for entropy encoding a syntax element of the given CU, so long as the given CU and the spatially-neighboring CUs are in the same tile. Because of these restrictions, video encoder 20 may be able to encode two or more of the tiles in parallel.

Figure 5:
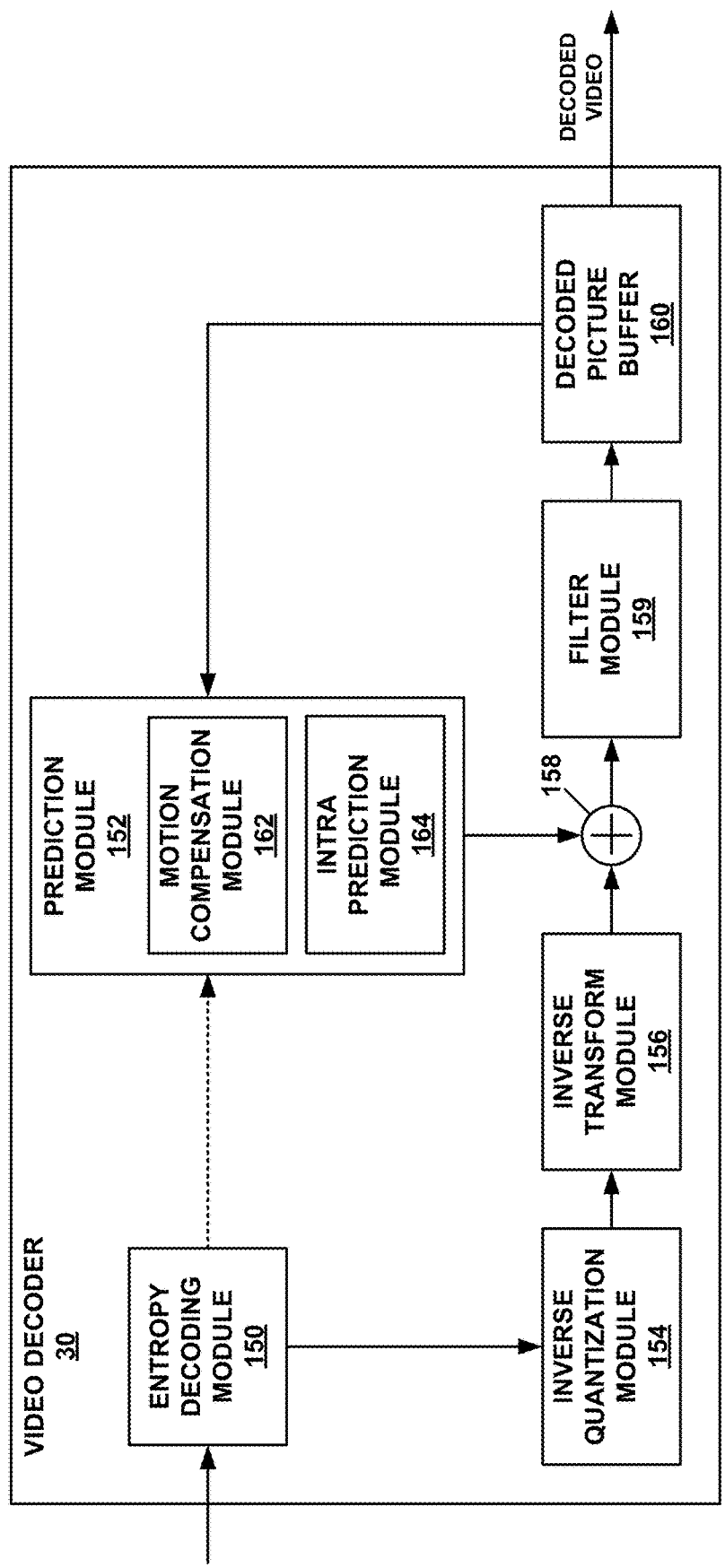
FIG. 5 is a block diagram illustrating an example video decoder that may implement the techniques of this disclosure.

FIG. 5 is a block diagram that illustrates an example video decoder 30 that may implement the techniques of this disclosure. FIG. 5 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 5, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 4. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding module 150 may perform a parsing operation on the bitstream. As a result of performing the parsing operation on the bitstream, entropy decoding module 150 may extract syntax elements from the bitstream. As part of performing the parsing operation, entropy decoding module 150 may entropy decode entropy encoded syntax elements in the bitstream. Prediction module 152, inverse quantization module 154, inverse transform module 156, reconstruction module 158, and filter module 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform an entropy decoding operation, such as a CAVLC decoding operation, on the coded slice header to recover the slice header.

After extracting the slice data from coded slice NAL units, entropy decoding module 150 may extract coded treeblocks from the slice data. Entropy decoding module 150 may then extract coded CUs from the coded treeblocks. Entropy decoding module 150 may perform parsing operations that extract syntax elements from the coded CUs. The extracted syntax elements may include entropy-encoded transform coefficient blocks. Entropy decoding module 150 may then perform entropy decoding operations on the syntax elements. For instance, entropy decoding module 150 may perform CABAC operations on the transform coefficient blocks.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block.

In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

If a PU of the CU was encoded using inter prediction, motion compensation module 162 may perform motion compensation to generate a predicted video block for the PU. Motion compensation module 162 may use motion information for the PU to identify a reference sample for the PU. The reference sample of a PU may be in a different temporal picture than the PU. The motion information for the PU may include a motion vector, a reference picture index, and a prediction direction. Motion compensation module 162 may use the reference sample for the PU to generate the predicted video block for the PU. In some examples, motion compensation module 162 may predict the motion information for the PU based on motion information of PUs that neighbor the PU. In this disclosure, a PU is an inter-predicted PU if video encoder 20 uses inter prediction to generate the predicted video block of the PU.

In some examples, motion compensation module 162 may refine the predicted video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predicted video block of the PU to calculate interpolated values for sub-integer samples of a reference block. Motion compensation module 162 may determine the interpolation filters used by video encoder 20 according to received syntax information and use the interpolation filters to produce the predicted video block.

If a PU is encoded using intra prediction, intra prediction module 164 may perform intra prediction to generate a predicted video block for the PU. For example, intra prediction module 164 may determine an intra prediction mode for the PU based on syntax elements in the bitstream. The bitstream may include syntax elements that intra prediction module 164 may use to predict the intra prediction mode of the PU. For example, intra prediction module 164 may perform the example intra-prediction operation of FIG. 6.

In some instances, the syntax elements may indicate that intra prediction module 164 is to use the intra prediction mode of another PU to predict the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 164 may then use the intra prediction mode to generate prediction data (e.g., predicted samples) for the PU based on the video blocks of spatially neighboring PUs.

Reconstruction module 158 may use the residual video blocks associated with TUs of a CU and the predicted video blocks of the PUs of the CU, i.e., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block. After reconstruction module 158 reconstructs the video block of the CU, filter module 159 may perform filter module 159 may perform a deblocking operation to reduce blocking artifacts associated with the CU.

Decoded picture buffer 160 may store decoded samples for pictures of the video data. Thus, after filter module 159 performs the deblocking operation, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Figure 6:
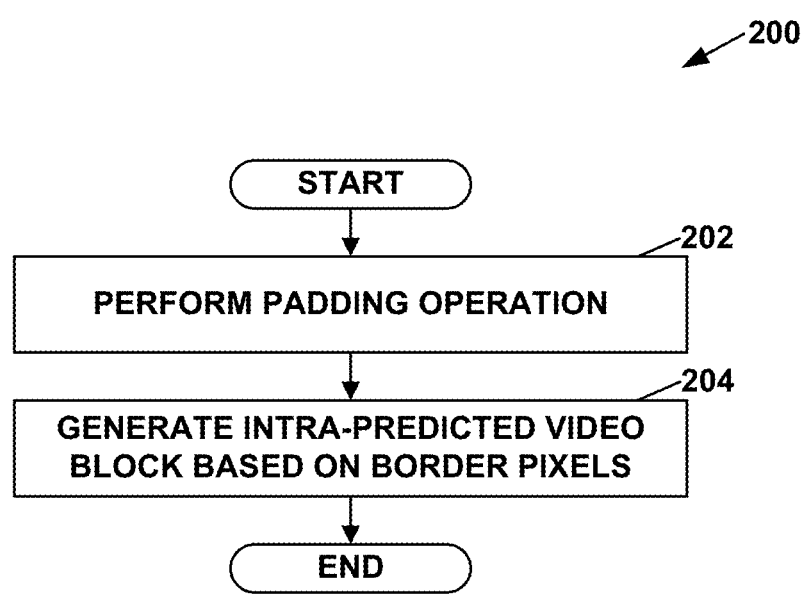
FIG. 6 is a flowchart that illustrates an example intra-prediction operation.

FIG. 6 is a flowchart that illustrates an example intra-prediction operation 200. A video coder, such as video encoder 20 or video decoder 30, may perform intra-prediction operation 200. In other examples, the video coder may use intra-prediction operations other than intra-prediction operation 200. For instance, in other examples, the video coder may perform an intra-prediction operation in which the video coder performs more, fewer, or different steps than intra-prediction operation 200.

After the video coder starts intra-prediction operation 200, the video coder may perform a padding operation for a PU (202). When the video coder performs the padding operation, the video coder may assign values to unavailable border pixels associated with the PU. The video coder may perform various padding operations. For instance, the video coder may perform the example padding operation of FIG. 7, the example padding operation of FIG. 8, the example padding operation of FIG. 10, or another padding operation.

After the video coder performs the padding operation, the video coder may generate, based on the border pixels, an intra-predicted video block for the PU (204). The video coder may use some or all of the border pixels to generate the intra-predicted video block.

Figure 7:
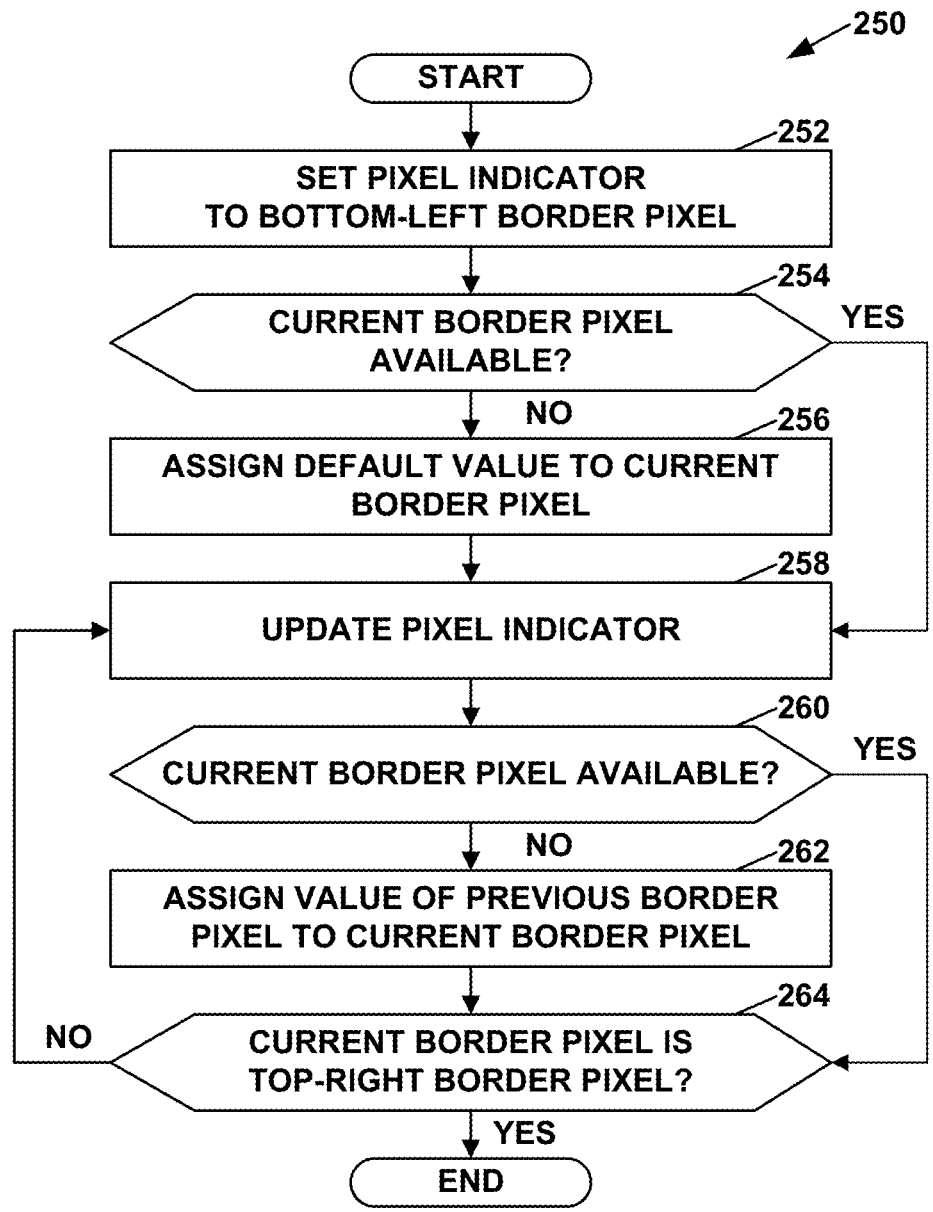
FIG. 7 is a flowchart that illustrates an example padding operation.

FIG. 7 is a flowchart that illustrates an example padding operation 250. A video coder, such as video encoder 20 or video decoder 30, may perform padding operation 250. In other examples, the video coder may use padding operations other than padding operation 250. For instance, in other examples, the video coder may perform a padding operation in which the video coder performs more, fewer, or different steps than padding operation 250.

After the video coder starts padding operation 250, the video coder may set a pixel indicator to indicate a bottom-left border pixel (252). For instance, in the example of FIG. 2, the video coder may set the pixel indicator to indicate border pixel P. For ease of explanation, this disclosure may refer to the border pixel indicated by the pixel indicator as the current border pixel.

Next, the video coder may determine whether the current border pixel is available (254). The video coder may determine whether the current border pixel is available in various ways. For example, the video coder may perform the example operation of FIG. 13 to determine whether the current border pixel is available.

In response to determining that the current border pixel is not available ("NO" of 254), the video coder may assign a default value to the current border pixel (256). Because the current border pixel is the bottom-left border pixel, the video coder may determine whether the bottom-left border pixel is available and assign a default value to the bottom-left border pixel in response to determining that the bottom-left border pixel is not available. In another example, the video coder may assign a value of a next available border pixel to the bottom-left border pixel in response to determining that the bottom-left border pixel is unavailable.

After assigning a value to the current border pixel or in response to determining that the current border pixel is available ("YES" of 254), the video coder may update the pixel indicator to indicate a next border pixel (258). If the current border pixel is between the bottom-left border pixel and the corner border pixel (e.g., border pixel R in FIG. 2), the next border pixel is immediately above the current border pixel. For instance, in the example of FIG. 2, if the current border pixel is border pixel P, the next border pixel is border pixel O. If the current border pixel is border pixel O, the next border pixel is border pixel N, and so on. If the current pixel is the corner border pixel or between the corner border pixel and the top-right border pixel (e.g., border pixel H in FIG. 2), the next border pixel is immediately to the right of the current border pixel. For instance, in the example of FIG. 2, if the current border pixel is border pixel R, the next border pixel is border pixel A. If the current border pixel is border pixel A, the next border pixel is border pixel B, and so on. By updating the pixel indicator, the next border pixel becomes the current border pixel.

After updating the pixel indicator, the video coder may determine whether the current border pixel is available (260). In response to determining that the current border pixel is not available ("NO" of 260), the video coder may assign the value of the previous border pixel to the current border pixel (262). In other words, the video coder may assign to the current border pixel a value of a border pixel that is immediately before the current border pixel according to the order. For instance, in the example of FIG. 2, if the current border pixel is border pixel M and border pixel M is unavailable, the video coder may assign the value of border pixel N to border pixel M. If the current border pixel is border pixel L and border pixel L is unavailable, the video coder may assign the value of border pixel M to border pixel L, and so on. When the video coder assigns a value of a first border pixel to a second border pixel, the video coder may not change the actual value of the second border pixel, but may use the value of the first border pixel as the value of the second border pixel for purposes of generating an intra-predicted video block.

After performing step 262 or in response to determining that the current border pixel is available ("YES" of 260), the video coder may determine whether the current border pixel is the top-right border pixel (264). For instance, in the example of FIG. 2, the video coder may determine whether the current border pixel is border pixel H. The video coder may end padding operation 250 in response to determining that the current border pixel is the top-right border pixel ("YES" of 264). On the other hand, in response to determining that the current border pixel is not the top-right border pixel ("NO" of 264), the video coder may again update the pixel indicator (258). The video coder may then repeat steps 260-264 with regard to the new current border pixel.

In this way, the video coder may perform a padding operation that processes a set of border pixels according to an order that starts at a bottom-left border pixel and proceeds through the border pixels sequentially to a top-right border pixel. When the padding operation processes an unavailable border pixel, the padding operation assigns a value to the unavailable border pixel based on a value of a pixel previously processed by the padding operation.

In an example padding operation similar to padding operation 250, (x, y) indicates the coordinates of the video block and (x−1,y−1) indicates the coordinates of the corner border pixel. If (x−1, y−1) is unavailable, the video coder may check the top predictor from left to right until the video coder reaches an available border pixel. If the available border pixel has coordinates (x+d, y−1), the video coder may assign the value of the border pixel at (x+d, y−1) to all border pixels from (x−1, y−1) to (x+d−1, y−1). Otherwise, if the border pixel at (x−1, y−1) is available, the video coder may set a variable d to −1 and execute the following pseudo-code:

```
for (i = d; i<2N; i++) {
    if the border pixel at (x+i, y-1) is available, do nothing
    if the border pixel at (x+i, y-1) is unavailable,
        assign the value of the border pixel at (x+i-1, y-1) to the border
        pixel at (x+i, y-1)
}
```

In the pseudo-code above, N may indicate the width of the video block. In addition, the video coder may determine whether the border pixel at (x−1, y) is available. If the border pixel at (x−1, y) is not available, the video coder may check the left predictor from top to bottom until the video coder reaches an available border pixel. If the available border pixel has coordinates (x−1, y+d), the video coder may assign the value of the border pixel at (x−1, y+d) to all border pixels from (x−1, y) to (x−1, y+d−1). Otherwise, if the border pixel at (x−1, y) is available, the video coder may set a variable d to 0 and execute the following pseudo-code:

```
for (i = d; i<2N; i++) {
    if the border pixel at (x-1, y+i) is available, do nothing
    if the border pixel at (x-1, y+i) is unavailable,
        assign the value of the border pixel at (x-1, y+i-1) to the border
        pixel at (x-1, y+i)
}
```

In the example of FIG. 7, for x=−1, y=nS*2−2 . . . −1, the video coder may substitute a value of p[x, y+1] for a value of p[x, y] if p[x, y] is an unavailable border pixel. For x=0 . . . nS*2−1, y=−1, substituting a value of p[x−1, y] for a value of p[x, y] if p[x, y] is an unavailable border pixel. nS is equal to a width or height of the intra-predicted video block, p is a two-dimensional array of samples, and p[0,0] is a top-left luma sample of the intra-predicted video block.

Figure 8:
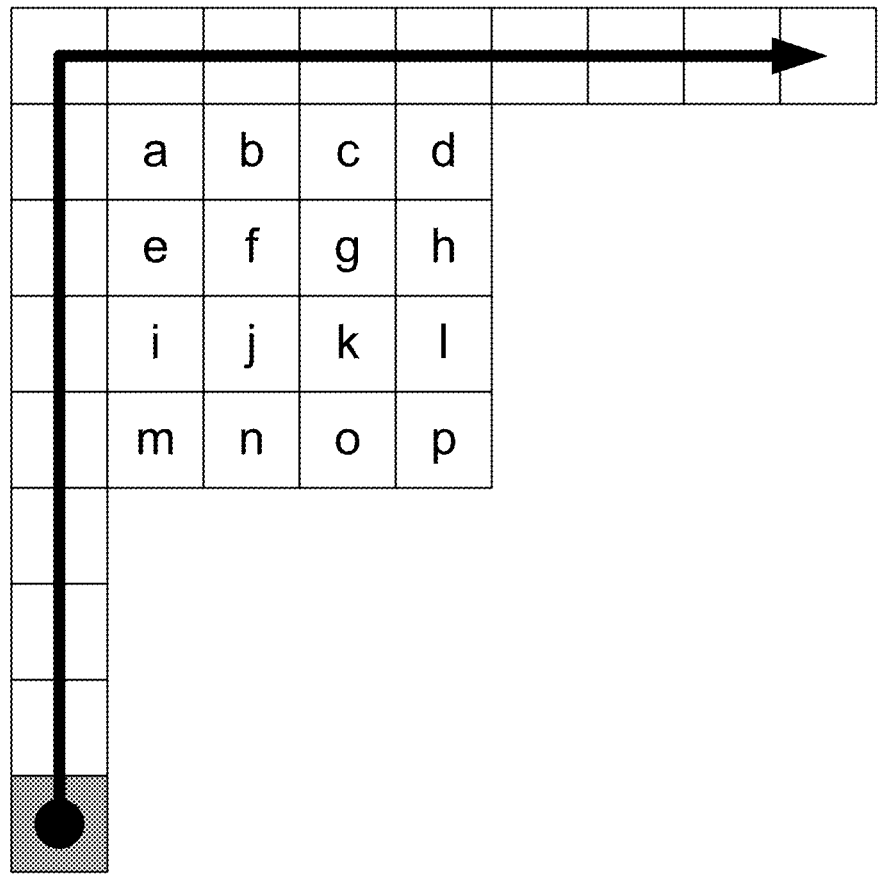
FIG. 8 is a conceptual diagram that illustrates an order in which the example padding operation of FIG. 7 proceeds through border pixels.

FIG. 8 is a conceptual diagram that illustrates an order in which the example padding operation of FIG. 7 proceeds through border pixels. As illustrated in the example of FIG. 8, the padding operation starts at the bottom-left border pixel, proceeds upward to the corner border pixel, and then proceeds rightward to the upper-right border pixel.

Figure 9:
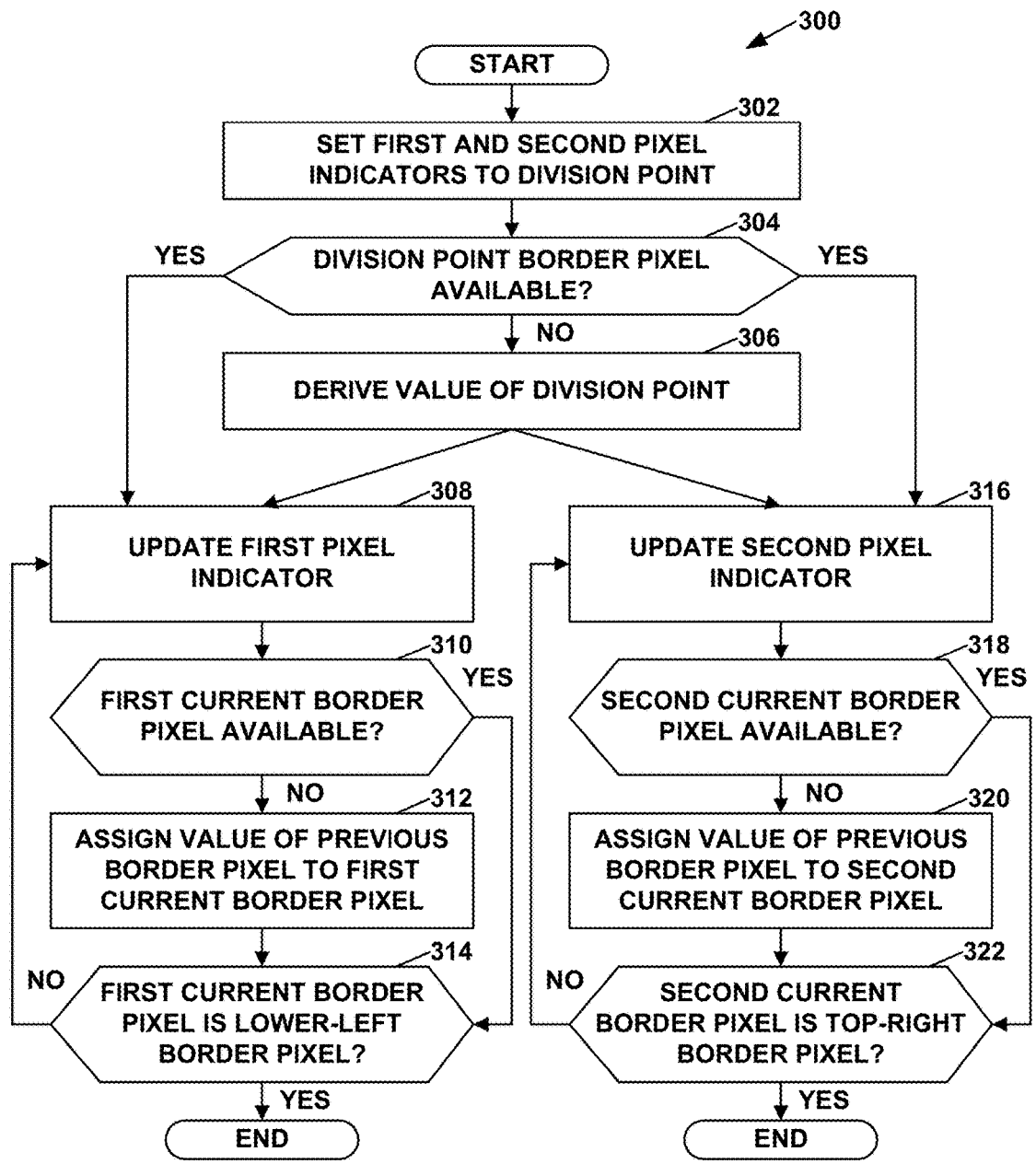
FIG. 9 is a flowchart that illustrates another example padding operation.

FIG. 9 is a flowchart that illustrates an example padding operation 300. A video coder, such as video encoder 20 or video decoder 30, may perform padding operation 300. In other examples, the video coder may use padding operations other than padding operation 300. For instance, in other examples, the video coder may perform a padding operation in which the video coder performs more, fewer, or different steps than padding operation 300.

After the video coder starts padding operation 300, the video coder may set a first pixel indicator and a second pixel indicator to indicate a division point (302). The division point may divide the border pixels into two segments. One of the segments may include border pixels that are above and to the right of the division point. The other one of the segments may include border pixels that are below and to the left of the division point.

The division point may be various ones of the border pixels. For example, the video coder may set the first and the second pixel indicators to the corner border pixel (e.g., border pixel R in FIG. 2). In another example, the video coder may set the first pixel indicator and the second pixel indicator to indicate another border pixel (e.g., border pixel L in FIG. 2).

After setting the first and second pixel indicators to indicate the division point, the video coder may determine whether the division point is available (304). The video coder may determine whether the division point is available in various ways. For example, the video coder may perform the example operation of FIG. 13 to determine whether the division point is available.

In response to determining that the division point is not available ("NO" of 304), the video coder may derive a value of the division point (306). The video coder may derive the value of the division point in various ways. For example, the video coder may determine whether either of the border pixels adjacent to the division point is available. In this example, if one of the border pixels adjacent to the division point is available, the video coder may derive the value of the division point by assigning the value of the adjacent border pixel to the division point. Furthermore, in this example, the video coder may assign a default value to the division point if neither of the adjacent border pixels is available. For instance, if the division point is the corner division point, the video coder may use the following pseudo-code to derive a value of the division point:

If $P_{L1}$ is available, $P_{pad}=P_{L1}$,
otherwise, if $P_{A1}$ is available, $P_{pad}=P_{A1}$, otherwise, $P_{pad}$=a default value.

In the pseudo-code above, $P_{L1}$ may indicate the value of the border pixel below the corner border pixel, $P_{pad}$ may indicate the derived value to be assigned to the corner border pixel, and $P_{A1}$ may indicate the value of the border pixel to the right of the corner border pixel. In the case that the corner border pixel and both the border pixel below and the border pixel to the right of the corner border pixel are unavailable, using a default value for the corner border pixel may have little impact on coding performance since this case may happen rarely.

After deriving the value of the division point or after determining that the division point is available ("YES" of 304), the video coder may update the first pixel indicator to indicate a border pixel that is below or to the left of the border pixel indicated by the first pixel indicator (308). For ease of explanation, this disclosure may refer to the border pixel indicated by the first pixel indicator as the first current border pixel. For instance, in the example of FIG. 2, if the first current border pixel is border pixel B, the video coder may update the first pixel indicator to indicate the border pixel A. If the first current border pixel is border pixel R, the video coder may update the first pixel indicator to indicate border pixel I. If the first current border pixel is border pixel I, the video coder may update the first pixel indicator to indicate border pixel J.

After updating the first pixel indicator, the video coder may determine whether the first current border pixel is available (310). The video coder may determine whether the first current border pixel is available in various ways. For example, the video coder may perform the example operation of FIG. 13 to determine whether the first current border pixel is available.

In response to determining that the first current border pixel is unavailable ("NO" of 310), the video coder may assign the value of the previous border pixel to the first current border pixel (312). For instance, in the example of FIG. 2, if the first current border pixel is border pixel I and border pixel I is unavailable, the video coder may assign the value of the border pixel R to border pixel I. If the first current border pixel is border pixel J and border pixel J is unavailable, the video coder may assign the value of the border pixel I to border pixel J, and so on.

Once the video coder has performed step 310 or after determining that the first current border pixel is available ("YES" of 310), the video coder may determine whether the first current border pixel is the bottom-left border pixel (314). In response to determining that the first current border pixel is the bottom-left border pixel ("YES" of 314), the video coder may end padding operation 300 with regard to border pixels occurring left of or below of the division point border pixel. However, in response to determining that the first current border pixel is not the bottom-left border pixel ("NO" of 314), the video coder may again update the first pixel indicator (308) and perform steps 310-314 with regard to another border pixel. In this way, padding operation 300 may assign values to each unavailable border pixel left of or below the division point border pixel.

In addition, after deriving the value of the division point border pixel in step 306 or in response to determining that the division point is available ("YES" of 304), the video coder may update the second pixel indicator to indicate a border pixel that is above or to the right of the border pixel indicated by the second pixel indicator (316). For ease of explanation, this disclosure may refer to the border pixel indicated by the second pixel indicator as the second current border pixel.

After updating the second pixel indicator, the video coder may determine whether the second current border pixel is available (318). The video coder may determine whether the current border pixel is available in various ways. For example, the video coder may perform the example operation of FIG. 13 to determine whether the second current border pixel is available.

In response to determining that the second current border pixel is unavailable ("NO" of 318), the video coder may assign the value of a previous border pixel to the second current border pixel (320). For instance, in the example of FIG. 2, if the second current border pixel is border pixel D and border pixel D is unavailable, the video coder may assign the value of border pixel C to border pixel D.

After performing step 320 or after the video coder has determined that the second current border pixel is available ("YES" of 318), the video coder may determine whether the second current border pixel is the top-right border pixel (322). In response to determining that the second current border pixel is the top-right border pixel, the video coder may end padding operation 300 with regard to border pixels that are to the right or above the division point border pixel ("YES" of 322). However, in response to determining that the second current border pixel is not the top-right border pixel ("NO" of 322), the video coder may update the second pixel indicator (316) and perform steps 318-322 with regard to another border pixel. In this way, the video coder may process each border pixel that is above or to the right of the division point.

In the example of FIG. 9, the video coder may perform steps 308-314 and steps 316-322 in parallel. In other examples, the video coder may perform steps 308-314 and steps 316-322 sequentially.

Figure 10:
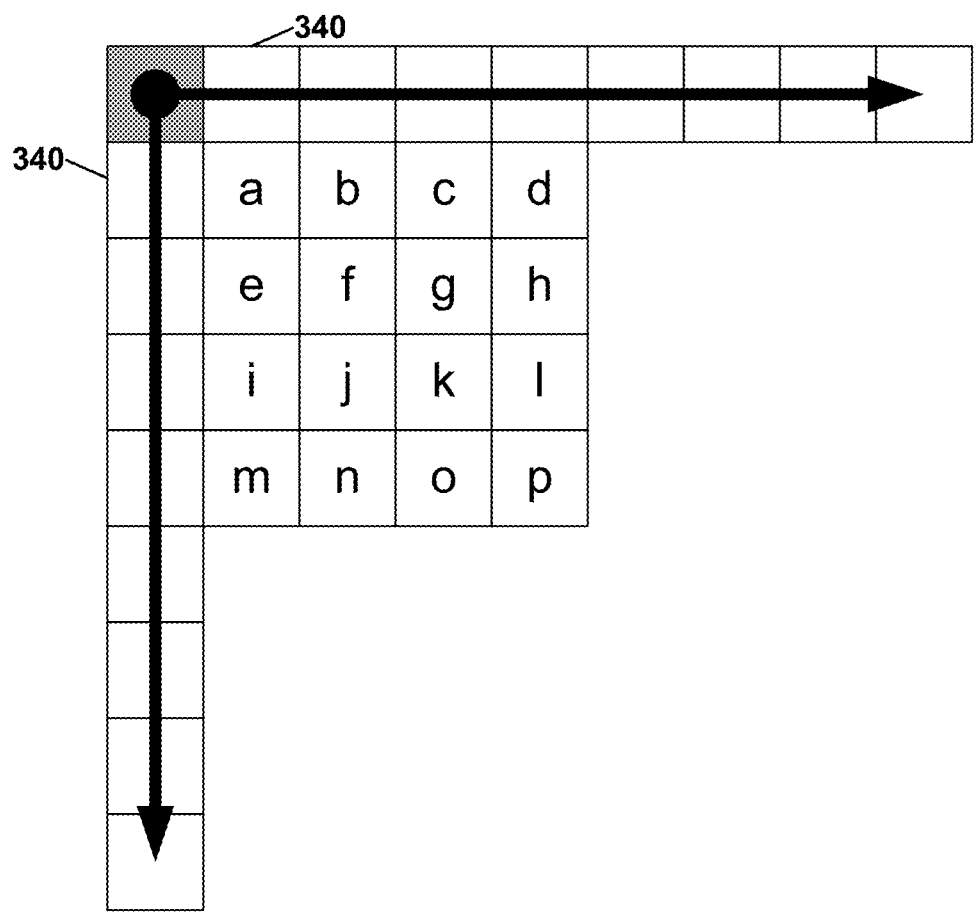
FIG. 10 is a conceptual diagram that illustrates an example order in which the padding operation of FIG. 9 proceeds through border pixels.

FIG. 10 is a conceptual diagram that illustrates an example order in which the padding operation of FIG. 9 proceeds through border pixels. As illustrated in the example of FIG. 10, the corner border pixel is the division point border pixel. The video coder may concurrently process border pixels below the corner border pixel (e.g., in steps 308-314) and border pixels right of the corner border pixel (e.g., steps 316-322). In the example of FIG. 10, the corner border pixel is shaded. If the corner border pixel is unavailable, the video coder may derive a value for the corner border pixel from either or both of neighboring border pixels 340.

In another example, the video coder may check from left to right across the top predictor until the video coder identifies an available border pixel. The video coder may then set the corner pixel and all border pixels between the corner pixel and the available border pixel to the value of the available border pixel. In this example, if the border pixel below the corner pixel is unavailable, the video coder may check from top to bottom along the left predictor until the video coder identifies an available border pixel. The video coder may then set each border pixel below the corner pixel to the value of the available border pixel.

Figure 11:
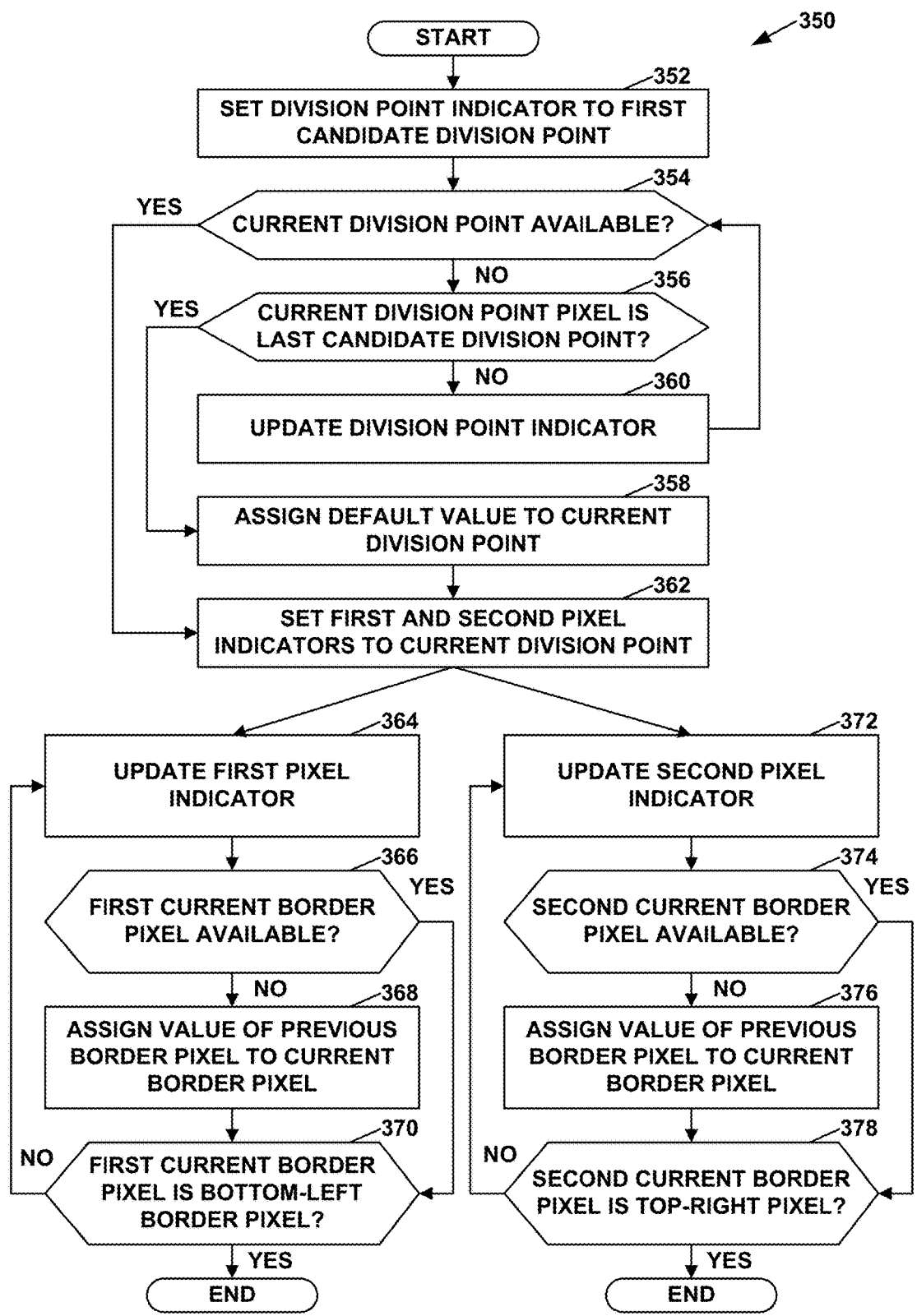
FIG. 11 is a flowchart that illustrates another example padding operation.

FIG. 11 is a flowchart that illustrates an example padding operation 350. A video coder, such as video encoder 20 or video decoder 30, may perform padding operation 350. In other examples, the video coder may use padding operations other than padding operation 350. For instance, in other examples, the video coder may perform a padding operation in which the video coder performs more, fewer, or different steps than padding operation 350.

In padding operation 350, the border pixels include a plurality of candidate division points. The plurality of candidate division points may include various ones of the border pixels. For example, the plurality of candidate division points may include the corner border pixel, a border pixel midway between the corner border pixel and the bottom-left border pixel, and a border pixel midway between the corner border pixel and the upper-right border pixel. In another example, the plurality of candidate division points may include the bottom-left border pixel and the upper-right border pixel. In another example, the plurality of candidate division points may include the border pixel immediately to the right of the corner border pixel and the border pixel immediately below the corner border pixel.

In another example, the plurality of candidate division points may include all border pixels between two border pixels, $P_{LX}$ and $P_{AY}$. In this example, $P_{LX}$ may be any border pixel from the corner border pixel to a bottom-left border pixel and $P_{AY}$ may be any border pixel from the corner border pixel to the top-right border pixel. In this example, the video coder may search through the candidate division points sequentially from $P_{LX}$ to $P_{AY}$ or from $P_{AY}$ to $P_{LX}$ for an available candidate division point. Searching for an available candidate division point in this manner may reduce searching complexity to a one dimensional search. For instance, in this example, if the division point is the bottom-left border pixel, the video coder to perform a padding operation that processes the set of border pixels according to an order that starts at the bottom-left border pixel and proceeds through the border pixels sequentially to a top-right border pixel, wherein when the padding operation processes an unavailable border pixel, the padding operation assigns a value to the unavailable border pixel based on a value of a border pixel previously processed by the padding operation.

In another example, the plurality of candidate division points may include all of the border pixels. In this example, the video coder may search for an available candidate division point through the candidate division points sequentially from a bottom-left border pixel to a top-right border pixel or vice versa. Searching for an available candidate division point in this manner may reduce searching complexity to a one directional search.

After the video coder starts padding operation 350, the video coder may set a division point indicator to indicate a first one of the candidate division points (352). For ease of explanation, this disclosure may refer to the candidate division point indicated by the division point indicator as the current division point. For instance, if the plurality of candidate division points includes the corner border pixel, the video coder may set the division point indicator to the corner border pixel.

After setting the division point indicator to indicate one of the candidate division points, the video coder may determine whether the current division point is available (354). The video coder may determine whether the current division point is available in various ways. For example, the video coder may perform the example operation of FIG. 13 to determine whether the current division point is available.

If the current division point is unavailable ("NO" of 354), the video coder may determine whether the current division point is a last one of the candidate division points to be checked (356). In response to determining that the current division point is the last one of the candidate division points, the video coder may assign a default value to the current division point (358). In other examples, the video coder may assign a value based on the values of neighboring pixels to the current division point instead of using the default value.

On the other hand, in response to determining that the current division point is not the last one of the candidate division points, the video coder may update the division point indicator such that the division point indicator indicates a next one of the candidate division points (360). For instance, in the example of FIG. 2, the plurality of candidate division points may include border pixel L, border pixel R, and border pixel D. If the current division point is border pixel L and border pixel L is unavailable, the video coder may update the division point indicator such that the division point indicator indicates border pixel R. The video coder may search for an available candidate division point in various ways. For example, the video coder may start with a candidate division point that is closest to the bottom-left border pixel and then search through the candidate division points toward the candidate division point that is closest to the top-right border pixel.

After updating the division point indicator, the video coder may determine again whether the current division point is available (354). In this way, the video coder may process candidate division points until the video coder determines that one of the candidate division points is available or until the video coder determines that none of the candidate division points is available, or vice versa.

After performing step 358 or after determining that the current division point is available ("YES" of 354), the video coder may set a first pixel indicator and a second pixel indicator to indicate the current division point (362). For example, if the current division point is the corner border pixel, the video coder may set the first and the second pixel indicators to indicate the corner border pixel (e.g., border pixel R in FIG. 2).

After setting the first and second pixel indicators to indicate the current division point, the video coder may update the first pixel indicator to indicate a border pixel that is below or to the left of the border pixel indicated by the first pixel indicator (364). For ease of explanation, this disclosure may refer to the border pixel indicated by the first pixel indicator as the first current border pixel. For instance, in the example of FIG. 2, if the first current border pixel is border pixel B, the video coder may update the first pixel indicator to indicate border pixel A. If the first current border pixel is border pixel R, the video coder may update the first pixel indicator to indicate border pixel I. If the first current border pixel is border pixel I, the video coder may update the first pixel indicator to indicate border pixel J.

After updating the first pixel indicator, the video coder may determine whether the first current border pixel is available (366). The video coder may determine whether the first current border pixel is available in various ways. For example, the video coder may perform the example operation of FIG. 13 to determine whether the first current border pixel is available.

In response to determining that the first current border pixel is unavailable ("NO" of 366), the video coder may assign the value of the previous border pixel to the first current border pixel (368). For instance, in the example of FIG. 2, if the first current border pixel is border pixel I and border pixel I is unavailable, the video coder may assign the value of border pixel R to border pixel I. If the first current border pixel is border pixel J and border pixel J is unavailable, the video coder may assign the value of border pixel I to border pixel J, and so on.

Once the video coder has assigned the value of the previous border pixel to the first current border pixel or after determining that the first current border pixel is available ("YES" of 366), the video coder may determine whether the first current border pixel is the bottom-left border pixel (370). In response to determining that the first current border pixel is the bottom-left border pixel ("YES" of 370), the video coder may end padding operation 300 with regard to border pixels occurring left of or below the current division point. However, in response to determining that the first current border pixel is not the bottom-left border pixel ("NO" of 370), the video coder may again update the first pixel indicator (364) and perform steps 366-370 with regard to another border pixel. In this way, padding operation 350 may assign values to each unavailable border pixel left of or below the current division point.

In addition, after setting the first and second pixel indicators to the current division point in step 362, the video coder may update the second pixel indicator to indicate a border pixel that is above or to the right of the border pixel indicated by the second pixel indicator (372). For ease of explanation, this disclosure may refer to the border pixel indicated by the second pixel indicator as the second current border pixel.

After updating the second pixel indicator, the video coder may determine whether the second current border pixel is available (374). The video coder may determine whether the second current border pixel is available in various ways. For example, the video coder may perform the example operation of FIG. 13 to determine whether the second current border pixel is available.

In response to determining that the second current border pixel is unavailable ("NO" of 374), the video coder may assign the value of a previous border pixel to the second current border pixel (376). For instance, in the example of FIG. 2, if the second current border pixel is border pixel D and border pixel D is unavailable, the video coder may assign the value of border pixel C to border pixel D.

After assigning the value of a previous border pixel to the second current border pixel or after the video coder has determined that the second current border pixel is available ("YES" of 374), the video coder may determine whether the second current border pixel is the top-right border pixel (378). In response to determining that the second current border pixel is the top-right border pixel, the video coder may end padding operation 300 with regard to border pixels that are to the right or above the current division point. However, in response to determining that the second current border pixel is not the top-right border pixel ("NO" of 378), the video coder may update the second pixel indicator (372) and perform steps 374-378 with regard to another border pixel. In this way, the video coder may process each border pixel that is above or to the right of the division point border pixel.

In the example of FIG. 11, the video coder may perform steps 364-370 and steps 372-378 in parallel. In other examples, the video coder may perform steps 364-370 and steps 372-378 sequentially.

Figure 12:
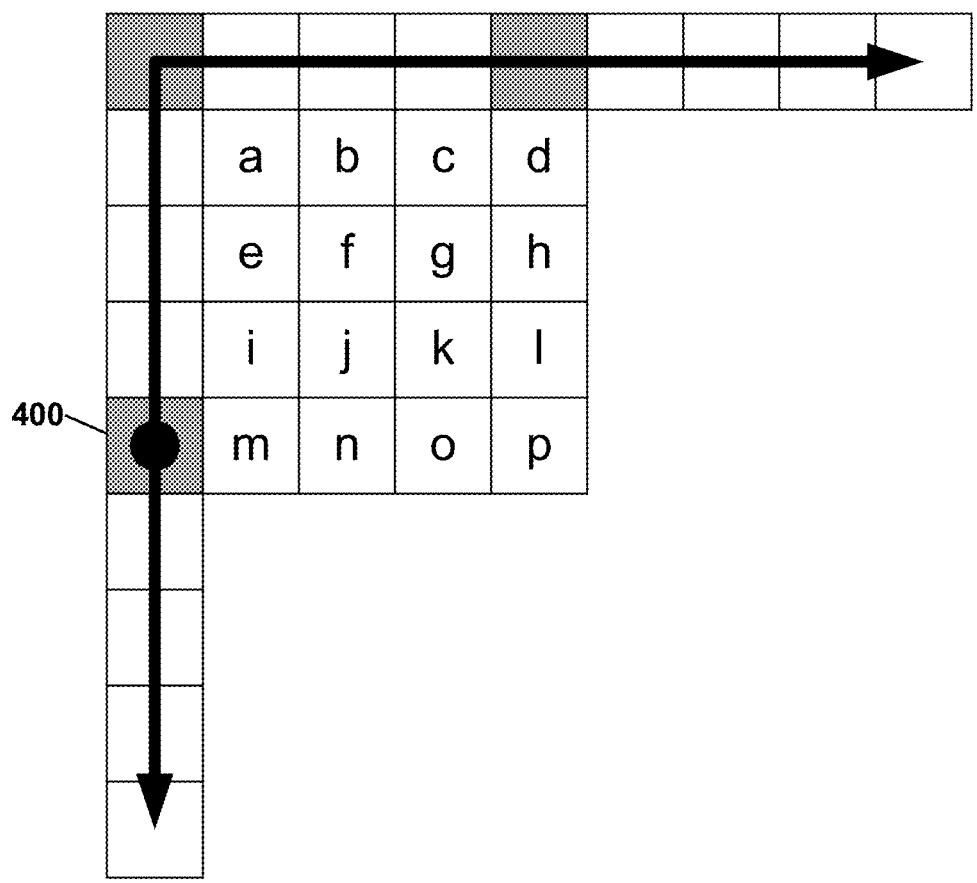
FIG. 12 is a conceptual diagram that illustrates an example order in which the padding operation of FIG. 11 proceeds through border pixels.

FIG. 12 is a conceptual diagram that an example order in which the padding operation of FIG. 11 proceeds through border pixels. As illustrated in the example of FIG. 12, the shaded border pixels are candidate division points. In the example of FIG. 12, border pixel 400 may be the selected division point and the video coder may concurrently process border pixels below the selected division point (e.g., in steps 364-370 of FIG. 11) and border pixels above and to the right of the selected division point (e.g., steps 372-378).

Figure 13:
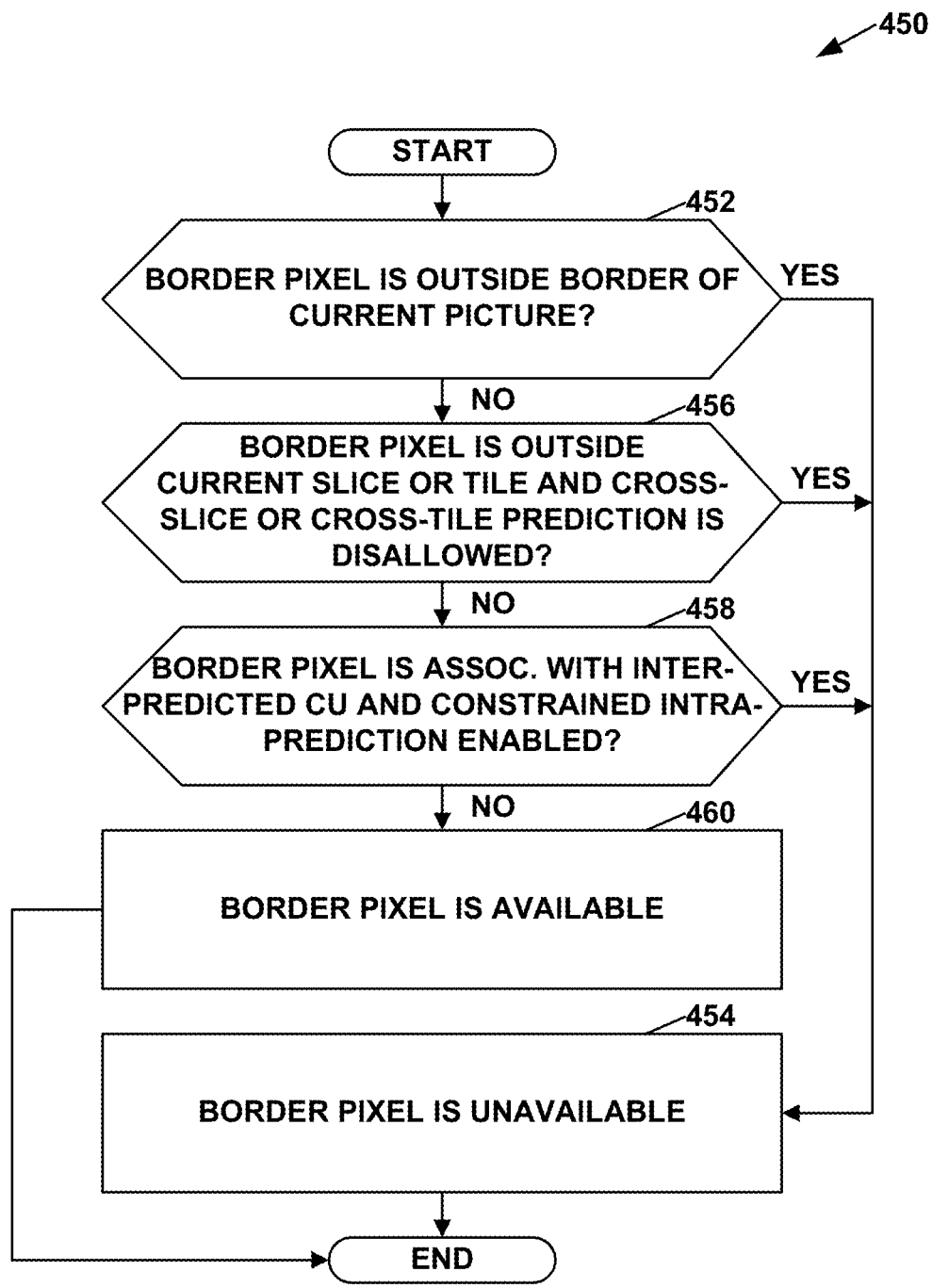
FIG. 13 is a flowchart that illustrates an example operation for determining whether a border pixel is available.

FIG. 13 is a flowchart that illustrates an example operation 450 to determine whether a border pixel is available. A video coder, such as video encoder 20 or video decoder 30, may perform operation 450. In other examples, the video coder may use operations other than operation 450 to determine whether a border pixel is available. For instance, in other examples, the video coder may perform an operation in which the video coder performs more, fewer, or different steps than operation 450.

After a video coder starts operation 450, the video coder may determine whether the border pixel is outside a border of a current picture (452). The current picture may be the picture that the video coder is currently coding. For instance, if the video coder is performing an intra-prediction operation for a PU whose video block is adjacent to a top or left edge of the current picture, one or more pixels above or to the left of the video block may be outside the border of the current picture. In response to determining that the border pixel is outside the border of the current picture ("YES" of 452), the video coder may determine that the border pixel is unavailable (454).

In response to determining that the border pixel is not outside the border of the current picture ("NO" of 452), the video coder may determine whether the border pixel is outside a border of a current slice or tile and cross-slice/cross-tile prediction is disallowed (456). The current slice or tile may be the slice or tile that the video coder is currently coding. For instance, if the video coder is performing an intra-prediction operation for a PU whose video block is adjacent to a top or left edge of the current slice or tile, one or more pixels above or to the left of the video block may be outside the border of the current slice or tile. If cross-slice prediction is allowed, the video coder is allowed to use values of pixels in a first slice to generate an intra-predicted video block for a CU in a second slice. In response to determining that the border pixel is outside the border of the current slice or tile and that cross-slice/tile prediction is disallowed ("YES" of 456), the video coder may determine that the border pixel is unavailable (454).

However, in response to determining that the border pixel is not outside the current slice or tile or that cross-slice/cross-tile prediction is allowed ("NO" of 456), the video coder may determine whether the border pixel is associated with an inter-predicted CU and whether constrained intra-prediction is enabled (458). In other words, if the border pixel belongs to an inter-predicted CU and constrained intra-prediction is enabled, the border pixel may be marked as not available or unavailable. The border pixel may be associated with an inter-predicted CU if the border pixel is in a video block associated with an inter-predicted CU.

In H.264/AVC, a macroblock (MB) in an inter-predicted slice may be either coded as inter MB or intra MB. Similarly, in HEVC, a CU in a P slice or a B slice may be an inter-predicted CU or an intra-predicted CU. Intra MBs and intra-predicted CUs are predicted from neighboring video blocks. In addition, a video coder may code constrained intra MBs. A video coder may generate a constrained intra MB from neighboring intra MBs in the same slice. In accordance with the techniques of this disclosure, a video coder may generate a constrained intra-predicted CU from video blocks of neighboring intra-predicted CUs, but not video blocks of neighboring inter-predicted CUs. A constrained intrapred flag may be signaled in a picture parameter set (PPS) to specify whether a group of pictures are being coded with the only inter and constrained intra modes.

Intra refresh may be an error resilience tool that enables a video encoder to insert intra MBs or intra-predicted CUs in order to reduce error propagation. In the event that a reference picture is lost, a video decoder may be unable to correctly decode inter MBs or inter-predicted CUs that use the reference picture. If the inter MBs or inter-predicted CUs are used to predict an intra MB or an intra-predicted CU, the video coder may be unable to decode the intra MB or the intra-predicted CU. Thus, the error may be propagated to the intra MB or the intra-predicted CU. Because constrained intra MBs and constrained intra-predicted CUs do not rely on inter MBs or inter-predicted CUs, the loss of the reference picture does not prevent a video decoder from decoding the constrained intra MBs or the intra-predicted CUs. Hence, it may be more error resilient to code the intra MBs or intra-predicted CUs as constrained intra MBs or constrained intra-predicted CUs.

In scalable video coding (SVC), a video decoder may not fully decode multiple dependency layers (with the same or different resolutions) because of the single-loop decoding design of the video decoder. In this case, when an intra-predicted base layer (BL) mode is used, the video decoder may only correctly decode enhancement layer MBs if the corresponding base layer intra MBs are coded as constrained intra MBs. Otherwise, the video decoder may need to predict the base layer intra MBs from reconstructed neighboring Inter MBs, which may not be available when decoding the enhancement layer in case of single-loop decoding.

In response to determining that the border pixel is associated with an inter-predicted CU and that constrained intra-prediction is enabled ("YES" of 458), the video coder may determine that the border pixel is unavailable (454). On the other hand, in response to determining that the border pixel is not associated with an inter-predicted CU or that constrained intra-prediction is not enabled ("NO" of 458), the video coder may determine that the border pixel is available (460).

In the examples above, a video coder may assign a default value or a value of previous border pixel to unavailable border pixels. In other examples, the video coder may interpolate values of unavailable border pixels. For instance, if there are one or more available border pixels on either side of a series of one or more unavailable border pixels. In this instance, the video coder may interpolate the values of the unavailable border pixels based on the values of the available border pixels on either side of the series of unavailable border pixels. The unavailable border pixels may be interpolated as $U_i = A_a + i*(A_b - A_a)/(M+1)$, i from 1 to M. In this equation, $A_a$ and $A_b$ are the available border pixels on either side of the series of unavailable border pixels, M is the number of unavailable border pixels in the series of unavailable border pixels, and $U_i$ indicates the unavailable border pixels. In the equation above M might not be a power of 2, so division may be needed.

Because M might not be a power of 2 and it may be desirable to avoid division, another technique may be used to interpolate the series of unavailable border pixels. According to this technique, let $Q=\text{Floor}(\log 2(M))$, $P=(1<<Q)$ and $R=M-P$. The video coder may set each of the unavailable border pixels in the right, which are $U_{P+1}$ to $U_M$, to the value of value of $A_b$. For any border pixel from $U_1$ to $U_P$, $$U_i = (A_a * i + A_b * (P-i) + P >> 1) >> Q, \text{ i from 1 to P}.$$

In some instances there are not available border on either side of a series of one or more unavailable border pixels. For example, consecutive unavailable border pixels may occur from until the end of the predictor. In this example, the video encoder may extend the value of the last available border pixel to the end of the predictor. In another example, consecutive unavailable border pixels may occur at the start of a predictor. In this example, the video coder may use the value of the first available border pixel as the value of the unavailable border pixels preceding the first available border pixel. Thus, in such instances, the video coder may use simple extension to generate the values for the unavailable reference samples.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data, the method comprising:
   determining, by a video coder, a division point among a set of border pixels, the division point dividing the border pixels into two segments;
   for a first segment of the two segments, performing, by the video coder, a padding operation according to an order that starts at the division point and proceeds through the border pixels sequentially to a top-right border pixel, the top-right border pixel being right of each other border pixel of the set of border pixels;
   for a second segment of the two segments, performing, by the video coder, the padding operation according to an order that starts at the division point and proceeds through the border pixels sequentially to a bottom-left border pixel, the bottom-left border pixel being below each other border pixel of the set of border pixels and the top-right border pixel being right of each other border pixel of the set of border pixels, wherein when the padding operation processes an unavailable border pixel other than the division point, the padding operation assigns a value to the unavailable border pixel equal to a value of a border pixel previously processed by the padding operation without searching for a next available border pixel; and
   generating, by the video coder, based on at least a plurality of the border pixels, an intra-predicted video block, wherein unavailable border pixels are border pixels outside a border of a current picture or border pixels whose actual values cannot be used to generate the intra-predicted video block.

2. The method of claim 1,
   wherein performing the padding operation for the first segment comprises determining, by the video coder, that a current border pixel of the first segment is unavailable based on the current border pixel of the first segment being associated with an inter-predicted coding unit (CU) and constrained intra-prediction being enabled; and
   wherein performing the padding operation for the second segment comprises determining, by the video coder, that a current border pixel of the second segment is unavailable based on the current border pixel of the second segment being associated with an inter-predicted CU and constrained intra-prediction being enabled.

3. The method of claim 1, wherein the method is performed during an encoding process, the method further comprising generating, by the video coder, encoded video data based on the intra-predicted video block.

4. The method of claim 3, further comprising generating, by the video coder, residual data based at least in part on the intra-predicted video block.

5. The method of claim 1, wherein the method is performed during a decoding process, the method further comprising generating, by the video coder, decoded video data based on the intra-predicted video block.

6. The method of claim 5, further comprising reconstructing, by the video coder, a decoded video block based at least in part on the intra-predicted video block and a residual video block.

7. The method of claim 1, wherein the division point is a corner pixel.

8. The method of claim 1, further comprising:
   based on a pixel at the division point being unavailable, deriving a value of the pixel at the division point from one or more border pixels neighboring the pixel at the division point.

9. The method of claim 1, wherein determining the division point comprises:
   checking, by the video coder, a plurality of candidate division points for a division point corresponding to an available border pixel; and
   based on a particular division point of the plurality of candidate division points corresponding to an available border pixel, determining, by the video coder, the particular division point is the division point.

10. The method of claim 1, wherein determining the division point comprises:
    checking, by the video coder, a plurality of candidate division points for a division point corresponding to an available border pixel; and
    based on none of the candidate division points corresponding to an available border pixel, determining, by the video coder, a particular division point of the plurality candidate division points is the division point and assigning a default value to the particular division point.

11. A video coding apparatus that comprises:
    a storage medium configured to store video data; and
    a video coder implemented using circuitry, software, or a combination thereof, the video coder configured to:
      determine a division point among a set of border pixels, the division point dividing the border pixels into two segments;
      for a first segment of the two segments, perform a padding operation according to an order that starts at the division point and proceeds through the border pixels sequentially to a top-right border pixel, the top-right border pixel being right of each other border pixel of the set of border pixels;
      for a second segment of the two segments, perform the padding operation according to an order that starts at the division point and proceeds through the border pixels sequentially to a bottom-left border pixel, the bottom-left border pixel being below each other border pixel of the set of border pixels and the top-right border pixel being right of each other border pixel of the set of border pixels, wherein when the padding operation processes an unavailable border pixel other than the division point, the padding operation assigns a value to the unavailable border pixel equal to a value of a border pixel previously processed by the padding operation without searching for a next available border pixel; and
      generate, based on at least a plurality of the border pixels, an intra-predicted video block of the video data, wherein unavailable border pixels are border pixels outside a border of a current picture or border pixels whose actual values cannot be used to generate the intra-predicted video block.

12. The video coding apparatus of claim 11,
    wherein the video coder is configured to determine that a current border pixel of the first segment is unavailable to be used for generation of the intra-predicted video block based on the current border pixel of the first segment being associated with an inter-predicted coding unit (CU) and constrained intra-prediction being enabled; and wherein the video coder is configured to determine that a current border pixel of the second segment is unavailable to be used for generation of the intra-predicted video block based on the current border pixel of the second segment being associated with an inter-predicted CU and constrained intra-prediction being enabled.

13. The video coding apparatus of claim 11, wherein the video coder is a video encoder and the video encoder is configured to generate encoded video data based on the intra-predicted video block.

14. The video coding apparatus of claim 13, wherein the video encoder is configured to generate residual data based at least in part on the intra-predicted video block.

15. The video coding apparatus of claim 11, further comprising a camera configured to capture video data encoded by the video encoder.

16. The video coding apparatus of claim 11, wherein the video coder is a video decoder and the video decoder is configured to generate decoded video data based on the intra-predicted video block.

17. The video coding apparatus of claim 16, wherein the video decoder is configured to reconstruct a decoded video block based on the intra-predicted video block and a residual video block.

18. The video coding apparatus of claim 16, further comprising a display configured to display the decoded video data.

19. The video coding apparatus of claim 11, wherein the division point is a corner pixel.

20. The video coding apparatus of claim 11, further comprising:
based on a pixel at the division point being unavailable, deriving a value of the pixel at the division point from one or more border pixels neighboring the pixel at the division point.

21. The video coding apparatus of claim 11, wherein the one or more processors are configured such that, as part of determining the division point, the one or more processors:
check a plurality of candidate division points for a division point corresponding to an available border pixel; and
based on a particular division point of the plurality of candidate division points corresponding to an available border pixel, determine the particular division point is the division point.

22. The video coding apparatus of claim 11, wherein the one or more processors are configured such that, as part of determining the division point, the one or more processors:
check a plurality of candidate division points for a division point corresponding to an available border pixel; and
based on none of the candidate division points corresponding to an available border pixel, determine a particular division point of the plurality candidate division points is the division point and assigning a default value to the particular division point.

23. The video coding apparatus of claim 11, wherein the video coding apparatus comprises at least one of:
an integrated circuit;
a microprocessor; or
a wireless handset.

24. A video coding apparatus comprising:
means for determining a division point among a set of border pixels, the division point dividing the border pixels into two segments;
means for performing, for a first segment of the two segments, a padding operation according to an order that starts at the division point and proceeds through the border pixels sequentially to a top-right border pixel, the top-right border pixel being right of each other border pixel of the set of border pixels;
means for performing, for a second segment of the two segments, the padding operation according to an order that starts at the division point and proceeds through the border pixels sequentially to a bottom-left border pixel, the bottom-left border pixel being below each other border pixel of the set of border pixels and the top-right border pixel being right of each other border pixel of the set of border pixels, wherein when the padding operation processes an unavailable border pixel other than the division point, the padding operation assigns a value to the unavailable border pixel equal to a value of a border pixel previously processed by the padding operation without searching for a next available border pixel; and
means for generating, based on at least a plurality of the border pixels, an intra-predicted video block, wherein unavailable border pixels are border pixels outside a border of a current picture or border pixels whose actual values cannot be used to generate the intra-predicted video block.

25. The video coding apparatus of claim 24,
wherein the means for performing, for the first segment, the padding operation comprises means for determining, for the first segment, that a current border pixel of the first segment is unavailable to be used for generation of the intra-predicted video block based on the current border pixel of the first segment being associated with an inter-predicted coding unit (CU) and constrained intra-prediction being enabled; and
wherein the means for performing, for the second segment, the padding operation comprises means for determining, for the second segment, that a current border pixel of the second segment is unavailable to be used for generation of the intra-predicted video block based on the current border pixel of the second segment being associated with an inter-predicted CU and constrained intra-prediction being enabled.

26. A non-transitory computer-readable storage medium that stores computer-executable instructions that, when executed, cause one or more processors to:
determine a division point among a set of border pixels, the division point dividing the border pixels into two segments;
for a first segment of the two segments, perform a padding operation according to an order that starts at the division point and proceeds through the border pixels sequentially to a top-right border pixel, the top-right border pixel being right of each other border pixel of the set of border pixels;
for a second segment of the two segments, perform the padding operation according to an order that starts at the division point and proceeds through the border pixels sequentially to a bottom-left border pixel, the bottom-left border pixel being below each other border pixel of the set of border pixels and the top-right border pixel being right of each other border pixel of the set of border pixels, wherein when the padding operation processes an unavailable border pixel other than the division point, the padding operation assigns a value to the unavailable border pixel equal to a value of a border pixel previously processed by the padding operation without searching for a next available border pixel; and generate, based on at least a plurality of the border pixels, an intra-predicted video block wherein unavailable border pixels are border pixels outside a border of a current picture or border pixels whose actual values cannot be used to generate the intra-predicted video block.

27. The non-transitory computer-readable medium of claim 26, wherein the computer-executable instructions cause the one or more processors to determine that a current border pixel is unavailable to be used for generation of the intra-predicted video block based on the current border pixel being associated with an inter-predicted coding unit (CU) and constrained intra-prediction being enabled.

* * * * *